United States Patent
Foley

(10) Patent No.: US 9,422,141 B2
(45) Date of Patent: Aug. 23, 2016

(54) SYSTEM AND METHOD FOR MANAGING A CURRENT FLOW IN A LIFT MACHINE

(75) Inventor: Martin Foley, Sherbrooke (CA)

(73) Assignee: TLD CANADA INC., Sherbrooke (Quebec) (CA)

( * ) Notice: Subject to any disclaimer, the term of this patent is extended or adjusted under 35 U.S.C. 154(b) by 508 days.

(21) Appl. No.: 13/880,766

(22) PCT Filed: Oct. 22, 2010

(86) PCT No.: PCT/CA2010/001692
§ 371 (c)(1),
(2), (4) Date: Apr. 22, 2013

(87) PCT Pub. No.: WO2012/051696
PCT Pub. Date: Apr. 26, 2012

(65) Prior Publication Data
US 2013/0213744 A1  Aug. 22, 2013

(51) Int. Cl.
*B66F 7/10* (2006.01)
*B66F 7/00* (2006.01)
(Continued)

(52) U.S. Cl.
CPC .............. *B66F 7/00* (2013.01); *B66F 7/065* (2013.01); *B66F 7/0625* (2013.01);
(Continued)

(58) Field of Classification Search
CPC .......... B66F 9/24; B66F 7/00; B66F 7/0625; B66F 7/0633; B66F 7/065; B66F 7/08; B64F 1/32; Y02E 60/17; H02J 7/345; H02J 15/003
USPC ....... 187/203, 210, 211, 247, 277, 290, 293, 187/391, 393
See application file for complete search history.

(56) References Cited

U.S. PATENT DOCUMENTS

| 3,512,072 A | 5/1970 | Karazija et al. |
| 4,509,127 A | 4/1985 | Yuki et al. |

(Continued)

FOREIGN PATENT DOCUMENTS

| JP | 4-333500 A | 11/1992 |
| JP | 2003252588 | 9/2003 |

(Continued)

OTHER PUBLICATIONS

Patil, Amar and Maliga, Grzegorz, Using ultracapacitors for saving energy in regenerative braking in hybrid vehicles, Wroclaw University of Technology.

(Continued)

*Primary Examiner* — Anthony Salata
(74) *Attorney, Agent, or Firm* — Baker & Hostetler LLP

(57) ABSTRACT

There is provided an energy management system for managing a current flow in a machine having a lift element being vertically movable by a motor assembly. The energy management system includes a power supplying bus for supplying the motor assembly, a battery source, an energy storage device and an associated controller, and a main controller for controlling the energy-storage-device controller and thus the powering of the motor assembly, while factoring a height and a movement of the lift element. The system generally seeks to manage the energy flow between the battery, motors and supercapacitors so as to maintain the battery current as low as possible by controlling the motor's speed, to maintain the battery power demand constant over time, and to store the regenerated energy into supercapacitors in order to avoid recharging the battery during operation, as well as to maintain the supercapacitors energy level as high as possible.

20 Claims, 17 Drawing Sheets

(51) Int. Cl.
*B66F 7/06* (2006.01)
*B66F 7/08* (2006.01)
*H02J 7/34* (2006.01)
*H02J 15/00* (2006.01)
*B66F 9/24* (2006.01)
*B64F 1/32* (2006.01)

(52) U.S. Cl.
CPC .............. *B66F 7/0633* (2013.01); *B66F 7/08* (2013.01); *B66F 9/24* (2013.01); *H02J 7/345* (2013.01); *H02J 15/003* (2013.01); *B64F 1/32* (2013.01); *Y02E 60/17* (2013.01)

(56) References Cited

U.S. PATENT DOCUMENTS

| | | | | |
|---|---|---|---|---|
| 4,690,606 | A * | 9/1987 | Ross | B64F 1/32 187/214 |
| 5,649,422 | A * | 7/1997 | Baginski | B66F 9/22 60/431 |
| 5,896,948 | A * | 4/1999 | Suur-Askola | B66B 1/30 187/290 |
| 6,005,360 | A | 12/1999 | Pace | |
| 6,075,331 | A * | 6/2000 | Ando | H02J 7/345 307/48 |
| 6,584,769 | B1 | 7/2003 | Bruun | |
| 6,742,630 | B2 * | 6/2004 | Eilinger | B66B 1/30 287/290 |
| 6,938,733 | B2 * | 9/2005 | Eilinger | B66B 5/027 287/290 |
| 7,681,694 | B2 * | 3/2010 | Aulanko | B66B 1/302 187/277 |
| 7,815,017 | B2 * | 10/2010 | Robbin | B65G 35/06 287/203 |
| 7,967,113 | B2 * | 6/2011 | Smith | B66B 5/027 187/289 |
| 8,022,663 | B2 * | 9/2011 | Davis | B60L 7/24 320/104 |
| 8,083,033 | B2 * | 12/2011 | Kallioniemi | B66B 1/2458 187/290 |
| 8,138,720 | B2 * | 3/2012 | Snyder | B60K 6/448 307/44 |
| 8,172,042 | B2 * | 5/2012 | Wesson | B66B 1/308 187/290 |
| 8,203,310 | B2 * | 6/2012 | McCabe | B60L 11/005 320/132 |
| 8,230,978 | B2 * | 7/2012 | Agirman | B66B 5/027 187/290 |
| 8,251,184 | B2 * | 8/2012 | De Jong | B66F 7/16 187/210 |
| 8,714,313 | B2 * | 5/2014 | Harkonen | B66B 1/302 187/289 |
| 2006/0070793 | A1 | 4/2006 | Akao | |
| 2007/0068714 | A1 | 3/2007 | Bender | |
| 2007/0090808 | A1 | 4/2007 | McCabe et al. | |
| 2008/0290842 | A1 | 11/2008 | Davis et al. | |
| 2009/0212626 | A1 | 8/2009 | Snyder et al. | |
| 2010/0097029 | A1 | 4/2010 | McCabe et al. | |
| 2013/0201732 | A1 * | 8/2013 | Barauna | H02M 7/003 363/37 |

FOREIGN PATENT DOCUMENTS

| | | |
|---|---|---|
| JP | 2006-321640 A | 11/2006 |
| JP | 2008087914 | 4/2008 |
| JP | 2008-297121 A | 12/2008 |
| JP | 2010-89855 A | 4/2010 |
| WO | 2007126310 | 11/2007 |
| WO | 2008143568 | 11/2008 |

OTHER PUBLICATIONS

European Search Report issued in European Patent Application No. 10858522.5 mailed Jul. 4, 2014.

* cited by examiner

SYSTEM AND METHOD FOR MANAGING A CURRENT FLOW IN A LIFT MACHINE

REFERENCE TO RELATED APPLICATIONS

This application is a National Stage of International Application No PCT/CA2010/001692, filed on Oct. 22, 2010, the disclosures of which is incorporated by reference in its entirety.

FIELD OF INVENTION

The present invention generally relates to aircraft loaders for lifting cargo and freight on and off an aircraft cargo bay. The invention more particularly concerns an aircraft cargo loader with an energy regeneration system.

BACKGROUND OF THE INVENTION

Aircraft loaders are used for aircraft servicing and are designed to transfer containers, pallets, equipment and other types of goods to and from aircraft. Existing loaders usually consist of a platform supported by a scissor assembly, which is in turn supported by a frame. Actuating means, generally consisting of hydraulic cylinders, are used to raise and lower the platform for loading or unloading goods to and from the aircraft. A loader is typically provided with front and rear wheels, and is powered by a diesel engine. The diesel engine drives not only the wheels but also the pump required for the hydraulic cylinders to raise the platform. Control of both the displacement of the loader and the platform is conducted from a control console, which is generally located on one side of the platform.

In order to reduce the operating costs of the loaders due to high variations in oil prices, and also with the objective of mitigating their environmental impact, some aircraft loaders are now using DC (direct current) batteries and electric motors to replace the traditionally used diesel engines. However, one drawback of using DC batteries for loaders is the need to recharge them frequently. The time required to recharge the DC batteries not only diminish the overall availability of the aircraft loaders, but also complicates their operation, since the recharging breaks must be planned and coordinated with the arrival and departure of each aircraft.

Although loaders provided with electric batteries are a great improvement over diesel motor-powered loaders, there is still a need for improved cargo loaders provided with a more efficient battery system that, for example, would help to minimize the length and number of breaks required to recharge the batteries.

In addition, since a great amount of energy is unused and lost when a cargo loader platform is lowered or when the platform wheels brake, it is desirable to reuse some of this lost energy to recharge the battery.

Known to the applicant are U.S. Pat. No. 5,649,422 (BAGINSKI), U.S. Pat. No. 4,690,606 (ROSS), Japanese patent application No. 2008/087914 (ISHIKAWA), as well as US patent applications Nos. 2008/0290842 (DAVIS) and 2009/0212626 (SNYDER).

Known to the applicant is U.S. Pat. No. 4,690,606 (ROSS), which discloses an aircraft cargo loader having a vertically operable platform which may be operated by a hydraulic cylinder. A motor-generator, powered by a rechargeably battery, actuates the lifting and lowering of the platform via the hydraulic cylinder. The system is configured such that when the motor generator is activated in a reverse mode, when lowering the platform, the regenerated energy is fed back, via the motor-generator, to recharge the battery.

Also known to the applicant is U.S. Pat. No. 5,649,422 (BAGINSKI), which teaches a lift apparatus for loading trucks. The lift device is operable by a hydraulic system which is fed by a rechargeable battery. Similarly to ROSS, potential energy stored in a raised position of the lift causes, upon lowering of the lift, to generate electric energy, via a motor pump generator assembly, in order to recharge the battery.

Also known to the applicant is Japanese patent application No. 2008/087914 (ISHIKAWA) discloses a lift apparatus having a hydraulic system, which is also adapted to convert potential energy into electric energy, during the lowering of a platform, in order to recharge the battery. An accumulator such as a capacitor may be used instead of or in conjunction with the battery.

Moreover, U.S. Pat. No. 3,512,072 (KARAZIJA), US patent application No. 2006/00700793 (AKAO), International PCT application having publication No. WO 2007/126,310 (DE JONG), as well as Japanese patent application No. 2003/252588 (HARUYAMA), also teach similar lift devices and/or mechanisms functioning with a hydraulic system and being adapted to convert potential energy into electric energy from the lowering of a lift in order to recharge a battery.

US patent application No. 2008/0290842 (DAVIS) teaches an energy regeneration system for an industrial vehicle being operable by a hydraulic circuit. A reversible motor pump is provided for feeding the lift system as well as for regenerating energy during the lowering of a hydraulic cylinder or deceleration of the vehicle. The energy source comprises a battery and a capacitor and the system is adapted such that the capacitor is discharged and recharged in priority in order to answer to high demands to electric current during short periods, and thus reduce the discharging and recharging of the battery. The control is provided by interrupters S1 and S2 which are opened or closed in order to direct current to and from desired components.

US patent application No 2009/0212626 (SNYDER) teaches an energy management system for hybrid vehicles which are subjected to high variations of energy (during acceleration, climbing a slope, etc.). The document is particularly directed to hybrid vehicles having a regenerative braking system. A fast energy storage is used in order to compensate for rapid high demands in energy. During such high demand periods, a transient current to be drawn from the supercapacitor is calculated based on the difference between an estimated current to be drawn from the battery and the current requested by the load. The transient current is provided by the supercapacitor via a DC/DC converter (direct current to direct current converter). Upon reaching a minimal energy level, the current is reduced and the total current transmitted to the motor generator is thus also reduced. During stable periods, the super-capacitor is recharged when the current requested from the battery is below a certain level or during regenerative braking, in order to prepare the super-capacitor for the next transient period.

US patent applications 2007/0068714 (BENDER) and a publication entitled (using ultra-capacitors for saving energy in regenerative braking and hybrid vehicles) (PATIL) also teach energy regeneration systems for hybrid vehicles, similarly to SNYDER. More particularly, a battery and a supercapacitor are used in order to prolong the life of the battery, by using the supercapacitors for short intense demands in energy which are not tolerated by the battery and for recuperating energy from regenerative braking.

Some important principles in the area of battery operated devices include the concepts of the Peukert law, power loss in cables, and rapid discharging and recharging of a battery.

The Peukert law generally expresses the capacity of a battery in terms of the rate at which it is discharged. Based on the Peukert effect, discharging the battery slower or faster increases or reduces the available energy from the battery. The following formula shows the relationship between a battery's measured discharge current and the energy removed from the battery:

$$I_{adjusted} = I^n C/(R(C/R)^n),$$

wherein $I_{adjusted}$ is a discharge current equivalent to energy taken out of the battery, I is a measured discharge current, n is an exponent related to the battery construction and age, R is a battery hour-rating, and C is a battery capacity.

Thus, as the discharge rate increases, the battery's available capacity decreases.

As is well known in the art, cables and electronic components promote power loss as electric current runs therethrough. This power loss is expressed by the following formula:

$$P = RI^2,$$

wherein

I is the current in Amperes (A), and

R is the resistance of the cable or component in Ohms.

Furthermore, a regeneration system using only a battery as an energy source is undesirable for a platform lift mechanism in a cargo loader. More particularly, the battery is discharged for raising the platform and recharged for lowering the platform, and in cases where the platform is lowered and very quickly raised again, the battery only has a short period of time to recharge. Since the necessary chemical reaction for recharging the battery may not have time to complete, the battery tends to behave as a mini-battery, which amplifies the Peukert effect as the battery capacity is perceived as being much smaller.

Furthermore, when charging and discharging, the battery generates heat, which represents a loss of energy. Moreover, the increase in temperature of the battery, caused by the recharging also reduces battery life.

Although some of the afore-mentioned documents teach energy regeneration systems seeking to better manage the charging and recharging of the battery, for example, by using a capacitor or by limiting upper and lower current values drawn from the battery, there is still a need for a better controlled energy management system, more specifically for cargo loaders, in order to optimize energy regeneration and battery life in such loaders.

Hence, in light of the aforementioned, there is a need for an improved system which, by virtue of its design and components, would be able to overcome some of the above-discussed prior art concerns.

SUMMARY OF THE INVENTION

It is an object of the present invention is to provide a device which, by virtue of its design and components, satisfies some of the above-mentioned needs and is thus an improvement over other energy management systems and/or methods known in the prior art.

In accordance with an aspect of the invention, there is provided an energy management system for managing a current flow in a machine having a lift element being vertically movable by a motor assembly, the energy management system comprising:

a power supplying bus for supplying the motor assembly;

a battery source being connected to the power supplying bus;

an energy storage device;

an energy-storage-device controller connected between the energy storage device and the power supplying bus, for controlling a current flow between the energy storage device and the power supplying bus;

sensors for detecting a height H and a movement of the lift element, said movement being selected from the group consisting of a lifting movement, a lowering movement and an immobile movement;

a first calculator connected to the sensors for calculating a minimum energy $E_{min}$ required in the energy storage device as a function of the height H of the lift element;

a second calculator connected to the energy storage device for calculating an energy $E_{available}$ stored in the energy storage device based on a voltage $V_{cap}$ detected at the terminals of the energy storage device and on a parameter of the energy storage device;

a comparator for calculating an Error where Error=$E_{min}$−$E_{available}$;

a third calculator for setting a lower limit $I_{min}$ of a current to be drawn from the energy storage device to 0 A when the movement detected by the sensors is the immobile or lowering movement, and for calculating the lower limit $I_{min}$ as a function of Error when the movement detected by the sensors is the lifting movement;

a fourth calculator for calculating an upper limit $I_{max}$ of a current to be supplied to the energy storage device as a function of Error when the movement detected by the sensors is the immobile or lowering movement;

and a main controller for controlling the energy-storage-device controller as a function of $I_{min}$, $I_{max}$, and the movement detected, to adjust the current flow between the energy storage device and the power supplying bus.

In accordance with another aspect of the invention, there is provided an energy management method for managing a current flow in a machine having a lift element being vertically operable by a motor assembly, the motor assembly being supplied with energy, through a power supplying bus, by a battery source and by an energy storage device via an energy-storage-device controller, the method comprising:

(a) detecting a height H and a movement of the lift element, said movement being selected from the group consisting of a lifting movement, a lowering movement and an immobile movement;

(b) calculating a minimum energy $E_{min}$ required in the energy storage device as a function of the height H of the lift element;

(c) calculating an energy $E_{available}$ stored in the energy storage device based on a voltage $V_{cap}$ detected at terminals of the energy storage device and on a parameter of the energy storage device;

(d) calculating an error Error where Error=$E_{min}$−$E_{available}$;

(e) setting a lower limit $I_{min}$ of a current to be drawn from the energy storage device to 0 A when the movement detected at (a) is the immobile or lowering movement, and calculating the lower limit $I_{min}$ as a function of Error when the movement detected at (a) is the lifting movement;

(f) calculating an upper limit $I_{max}$ of a current to be supplied to the energy storage device as a function of Error when the movement is the immobile or lowering movement; and (g) controlling the energy-storage-device controller as a function of $I_{min}$, $I_{max}$ and the movement detected at (a) to manage the current flow between the energy storage device and the power supplying bus.

Other preferred aspects, features, embodiments, variants and/or resulting advantages of the present invention will be summarized hereinbelow.

In accordance with an embodiment of the present invention, there is provided an aircraft cargo loader comprising: a supporting structure movable between lowered and raised positions; actuating means for moving the supporting structure from the lowered position to the raised position; a battery for powering the actuating means; converting means for converting potential energy into electricity when the supporting structure moves from its raised position to its lowered position by gravitational force, the converting means having an electrical output connected to the battery for recharging said battery.

Preferably, the supporting structure comprises a platform supported by a scissor or a grasshopper assembly; the actuating means comprises fluid-driven actuators operatively mounted to the scissor or the grasshopper assembly, and are provided with controllable valves; the actuating means further comprises electric motor pump assemblies, each coupled to the fluid-driven actuators via the controllable valves, for moving the supporting structure between the lowered and the raised positions; a main controller is connected to the controllable valves and to the electric motor pump assemblies, for controlling operation of the controllable valves and of the electric motor pump assemblies; the battery is further connected to the main controller and a current converter; and the converting means comprises control means, which can be a PLC, and a supercapacitor assembly.

According to this preferred embodiment, when the fluid-driven actuators are extended, and the platform is in a raised position, a first control signal is sent from the main controller to the controllable valves in order to allow the fluid to exit from the actuators, thereby lowering the aircraft cargo loader platform. The fluid exiting a given one of the actuators is directed to its associated electric motor pump assembly, preferably via a hydraulic logic block. Each electric motor pump assembly transforms the potential energy of the fluid to electrical energy, and the control means directs the electrical energy to the supercapacitor assembly, preferably via a current converter. If the supercapacitor assembly is fully charged, the energy is redirected to the battery.

Advantageously, the energy regeneration system uses energy accumulated within the actuators to recharge the battery and the supercapacitor assembly (i.e. energy storage device) during the lowering of the platform, through the use of the motor pump assemblies. Once the supercapacitor assembly (i.e. energy storage device) is recharged, the excess of energy generated by the lowering of the platform is directed to the battery.

In a preferred embodiment of the aircraft loader, the loader further comprises: driving wheels connected to the frame for displacing the loader; wheel motors connected to the driving wheels and to the hydraulic logic block; the main controller being further connected to the electric motor pump assembly for controlling the wheel motors.

To set the loader in motion, the main controller controls the hydraulic logic block to route the fluid from an electric motor pump assembly to the wheel motors, which use the fluid energy to rotate the driving wheels. If the energy stored in the supercapacitor assembly (i.e. energy storage device) is insufficient, the control means directs electrical energy from the battery to the electrical motor pump, which will pump fluid back to the wheel motor via the hydraulic logic block.

Preferably, the fluid-driven actuators are hydraulic cylinders, the controllable valves are ON/OFF solenoid valves and the current converters are DC/DC converters. The electric motor pump assemblies consist of an AC motor connected to a gear pump, and the supercapacitor assembly comprises more than one supercapacitor.

Still preferably, the supporting assembly comprises a frame at ground level. A spring is connected to the frame, the spring being able to accumulate energy when the platform is lowered and transfer it back to the platform when the platform is lifted, thereby reducing the energy required to push fluid into the actuator.

BRIEF DESCRIPTION OF THE DRAWINGS

Other objects, advantages and features of the present invention will become more apparent upon reading the following non-restrictive description of preferred embodiments thereof, given for the purpose of exemplification only, with reference to the accompanying drawings in which.

DESCRIPTION OF PREFERRED EMBODIMENTS

In the following description, the same numerical references refer to similar elements. In order to preserve clarity, certain elements may not be identified in some figures, if they are already identified in a previous figure. The embodiments mentioned and/or geometrical configurations and dimensions shown in the figures or described in the present description are embodiments of the present invention only, given for exemplification purposes only.

In the present context, although the preferred embodiment of the present invention as illustrated in the accompanying drawings comprises components such as supercapacitors, a DC/DC converter, a DC bus, a PLC, etc. and although the associated method include steps as explained and illustrated herein, not all of these components, configurations and steps are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable configurations, organizations and/or architectures may be used for the energy management system according to the present invention, as will be briefly explained herein and as can be easily inferred herefrom, by a person skilled in the art, without departing from the scope of the invention. Moreover, the order of the steps provided herein should not be taken as to limit the scope of the invention, as the sequence of the steps may vary in a number of ways, without affecting the scope or working of the invention, as can also be understood by a person skilled in the art.

Figure 1:
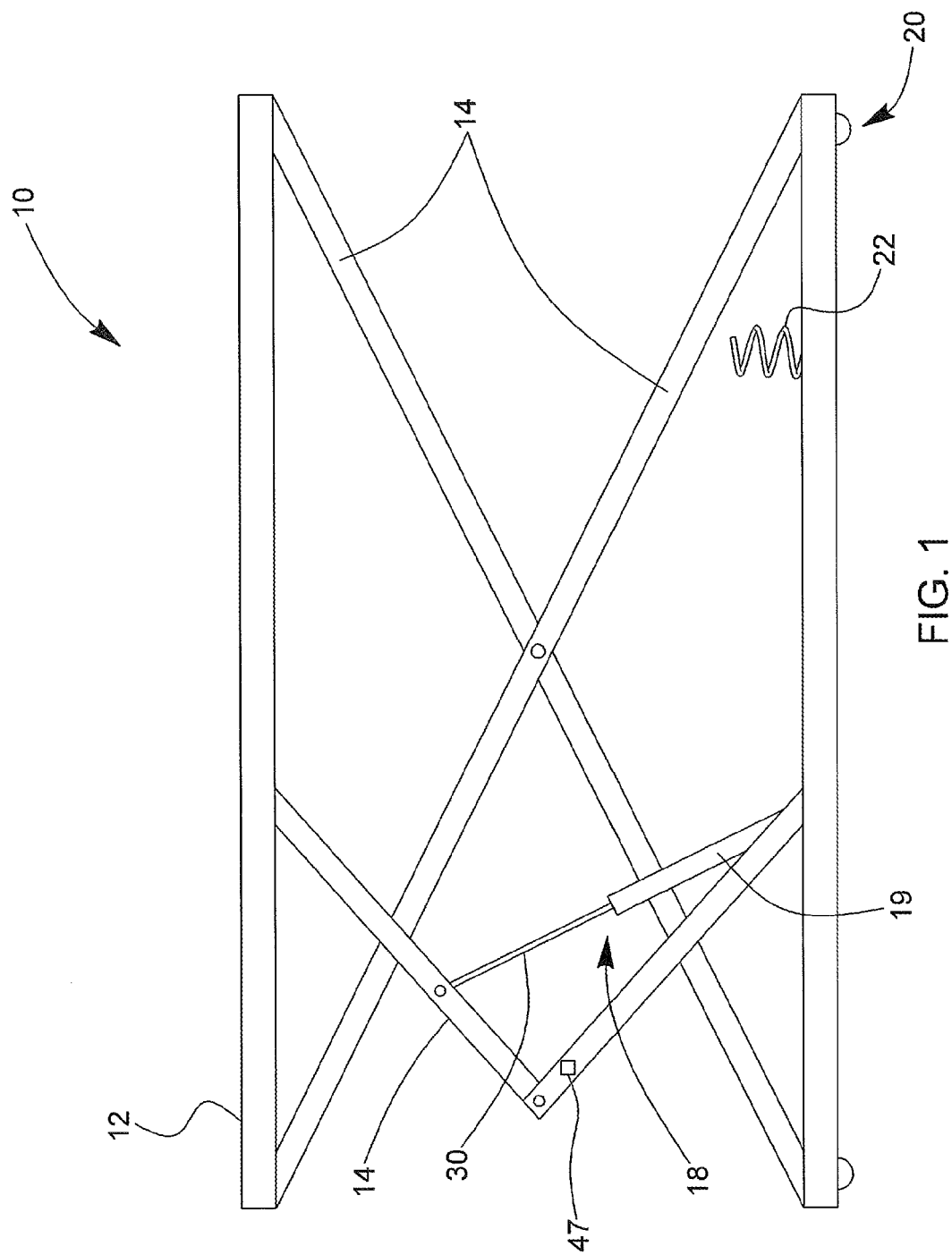
FIG. 1 is a schematic diagram of an aircraft loader.
Figure 2:
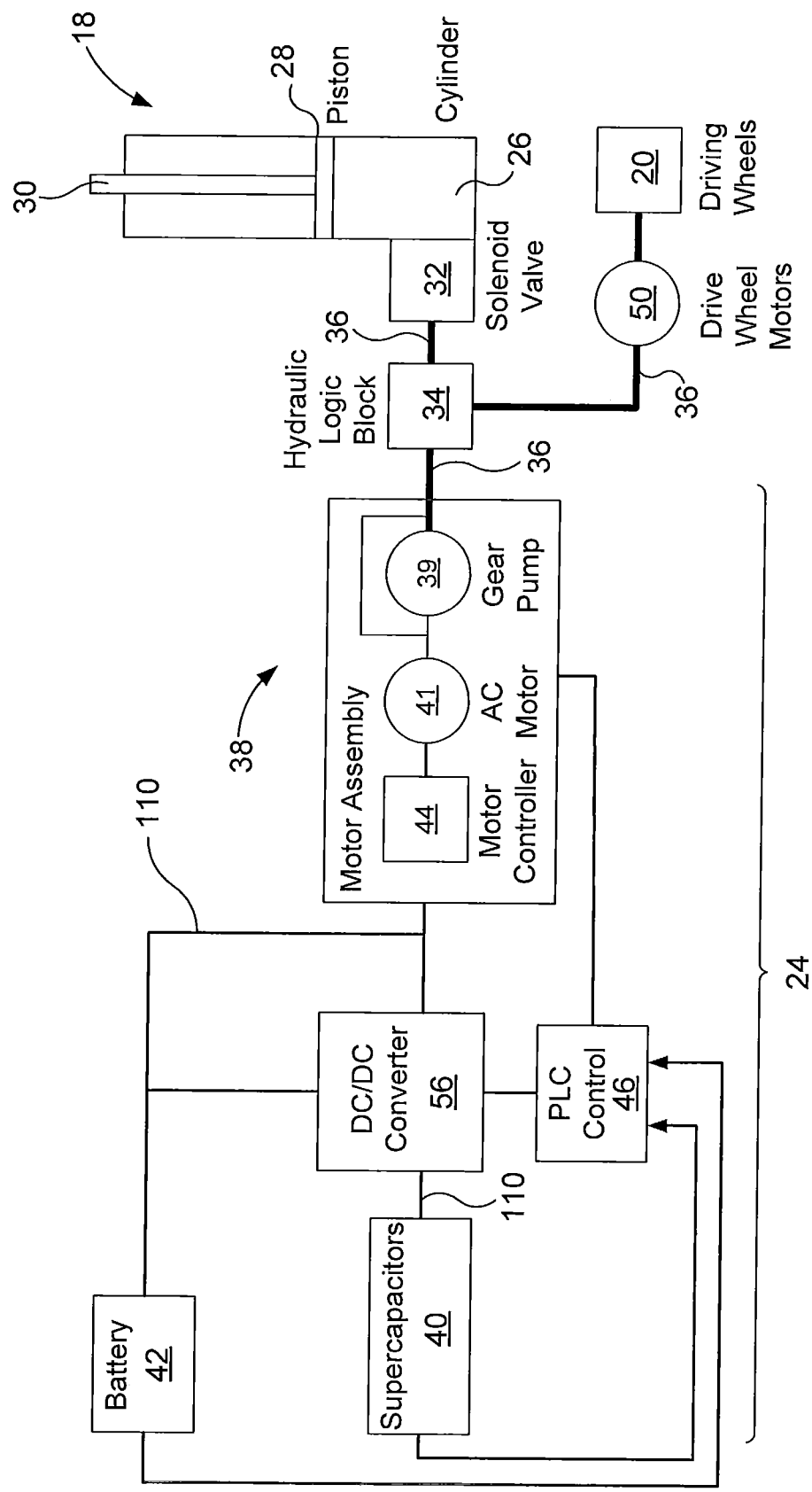
FIG. 2 is a block diagram showing elements of an energy management system according to an embodiment of the present invention.
Figure 5:
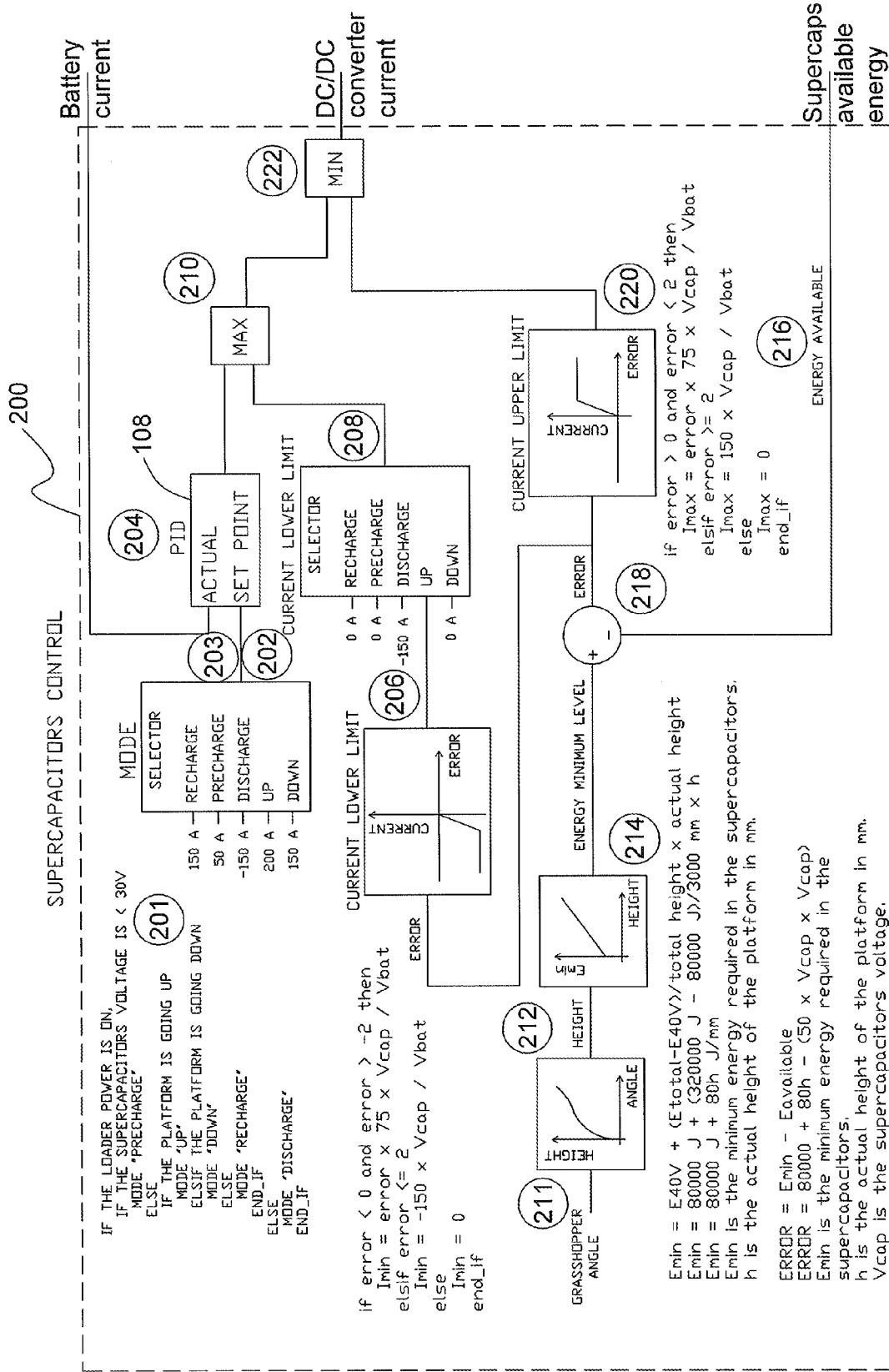
FIG. 5 is a block diagram showing one of the closed-loop control systems shown in FIG. 4, according to an embodiment of the present invention.

According to an embodiment of the present invention, with reference to FIGS. 1, 2 and 5, there is provided an energy management method for managing a current flow in a machine, such as a cargo loader 10, having a lift element 12 being vertically operable by a motor assembly 38, the motor assembly 38 being supplied with energy, through a power supplying bus 110, by a battery source 42 and by an energy storage device via an energy-storage-device controller, as will be further described below. The energy storage device is preferably one or more supercapacitor 40 (also referred to herein as "supercapacitor source" or "supercapacitors"). Moreover, the energy-storage-device controller is preferably a DC/DC converter 56.

The method includes:
(a) detecting 212, 201 a height H and a movement of the lift element 12, said movement being selected from the group consisting of a lifting movement, a lowering movement and an immobile movement;
(b) calculating 214 a minimum energy $E_{min}$ required in the supercapacitor source 40 as a function of the height H of the lift element 12;
(c) calculating 216 an energy $E_{available}$ stored in the supercapacitor source 40 based on a voltage $V_{cap}$ detected at terminals of the supercapacitor source 40 and on a parameter of the supercapacitor source 40;
(d) calculating 218 an error Error where Error=$E_{min}$−$E_{available}$;
(e) setting 208 a lower limit $I_{min}$ of a current drawn from the supercapacitor source 40 to 0 A when the movement detected at (a) is the immobile or lowering movement, and calculating 206 the lower limit $I_{min}$ as a function of Error when the movement detected at (a) is the lifting movement;
(f) calculating 220 an upper limit $I_{max}$ of a current to be supplied to the supercapacitor source 40 as a function of Error when the movement is the immobile or lowering movement; and
(g) controlling 222 the DC/DC converter as a function of $I_{min}$, $I_{max}$ and the movement detected at (a) to manage the current flow between the supercapacitor source 40 and the power supplying bus 110.

The above-mentioned method is performed by an energy management system including:
a power supplying bus 110 for supplying the motor assembly 38; a battery source 42 being connected to the power supplying bus 110;
an energy storage device, preferably supercapacitor source 40;
an energy-storage-device controller, preferably a DC/DC converter 56 connected between the supercapacitor source 40 and the power supplying bus 110, for controlling a current flow between the supercapacitor source 40 and the power supplying bus 110;
sensors for detecting a height H and a movement of the lift element 12, said movement being selected from the group consisting of a lifting movement, a lowering movement and an immobile movement;
a first calculator connected to the sensors for calculating a minimum energy $E_{min}$ required in the supercapacitor source as a function of the height H of the lift element;
a second calculator connected to the supercapacitor source 40 for calculating an energy $E_{available}$ stored in the supercapacitor source 40 based on a voltage $V_{cap}$ detected at the terminals of the supercapacitor source 40 and on a parameter of the supercapacitor source 40;
a comparator for calculating an Error where Error=$E_{min}$−$E_{available}$;
a third calculator for setting a lower limit $I_{min}$ of a current drawn from the supercapacitor source 40 to 0 A when the movement detected by the sensors is the immobile or lowering movement, and for calculating the lower limit $I_{min}$ as a function of Error when the movement detected by the sensors is the lifting movement;
a fourth calculator for calculating an upper limit $I_{max}$ of a current to be supplied to the supercapacitor source 40 as a function of Error when the movement detected by the sensors is the immobile or lowering movement; and
a controller 46 for controlling the DC/DC converter 56 as a function of $I_{min}$, $I_{max}$, and the movement detected, to adjust the current flow between the supercapacitor source 40 and the power supplying bus 110.

By "vertically operable", it is meant capable of movement along any trajectory being substantially aligned with the direction of the force of gravity (i.e. vertical direction), or capable of a movement having a vectorial component which is vertical.

By "battery source", it is meant one or more battery or similar energy source for producing electricity.

By "energy storage device", it is meant any suitable energy storage means capable of storing energy, of discharging electricity and of receiving an electric current in order to be recharged with energy. Such a device may include one or more capacitor, supercapacitor, ultracapacitor, a flywheel, a battery, any suitable fast energy storage means, etc. and/or a combination thereof. In the present context, the terms "supercapacitor", "supercapacitors" and "supercapacitor assembly" refer to one or more supercapacitor and may be used interchangeably.

By "energy-storage-device controller" it is meant any suitable controller being adapted to control the energy being discharged from or recharged to the energy storage device. Such a controller may include a converting means, such as a DC/DC converter. One or more DC/DC converter may be used, depending on the loader model. The energy-storage-device controller may be made integral with the energy storage device, according to embodiments of the present invention, as can be understood by a person skilled in the art.

Moreover, by "sensor" it is meant any conventional sensor, transducer, detector, actuator or the like, including any suitable signal or data emitting device which outputs information related to the determining of said height H and/or movement of the platform. Indeed, according to a preferred embodiment of the present invention, the movement is detected at the main PLC 46, based on command input received via a user interface from an operator. Indeed, when the operator inputs a raising or lowering command, the command is detected and corresponding information is output in order to indicate that the movement of the platform is a lifting or lowering movement, respectively. Such a system preferably cooperates with other data received, for example after the platform has reached a maximum height, the system identifies that despite an operator inputting a raising command, that the platform no longer has a lifting movement, but rather an immobile movement. Alternatively, in order to detect the movement of the platform, conventional sensors or transducers may also be used, for example a distance sensor, a speed sensor, etc. The sensor used for detecting the height H also be any suitable sensor. For example, an inclinometer may be used, as will be exemplified further below. Alternatively, the height H may be obtained from a distance sensor, a position sensor or, similarly to the determination of the platform movement, the height H may be obtained based on a user input command. Moreover, a same detector may be provided for detecting both the height H and the movement of the platform, as can be understood by a person skilled in the art for example by using position sensor or distance sensor.

Throughout the description, it should be understood that the "main controller" may include any suitable controlling device or means, provided for processing information and, at the very least, governing operations of the energy-storage-device controller according to the processed information, via corresponding control signals, data and/or the like being transmitted thereto. The main controller may be provided in a single component or may include a plurality of components. Such component(s) may include a microcontroller, a suitable chip, a programmable controller, such as a an programmable logic controller (PLC), an AC motor controllers, a micro controller bus, such as a Controller area network (CAN) controller, etc., and/or any combination thereof, as well as any equivalent circuitry and/or software. In addition, the controller may include memory storage means. In the present context, the main control includes a programmable logic controller (PLC).

Moreover, it is to be understood that some of the first, second, third and fourth calculators, as well as the comparator may be provided in a unitary component. Indeed and for example, they may all be integrated with the main controller in a PLC.

Furthermore, the power supplying bus may be any suitable power distributing channel. The bus is preferably shared by the battery source, the energy-storage-device controller and the electric motor-pump assembly, and is preferably a 80V DC bus. Alternatively, any similar or equivalent component and/or assembly or grouping thereof is meant to be encompassed by the term "power supplying bus".

Advantageously, the system is thus controlled so as to store energy regenerated, for example, as the platform is being lowered, into the supercapacitors firstly, in order to avoid recharging the battery too readily. Moreover, when the platform is raised, energy may be transferred from the supercapacitors to the 80V bus line to reduce the battery power demand. Embodiments of the present invention are also advantageous for machines and devices having vertically movable lifts, in that information on the height of the lifting element is taken into consideration, as well as various parameters of each component of the system, in order to optimize the battery life in an energy regeneration system for such machines and devices, given that the height of the lift element impacts such system, as will be better explained further below. Moreover, the current flow, and thus the powering of the motor, is managed in a very controlled manner, so as to also better optimize the energy management system as desired, as will also be better explained further below.

Referring to FIG. 1, a broad description of the aircraft cargo loader 10 and system will be given. The aircraft cargo loader 10 is shown, having a platform 12, which is used to support cargo. The platform 12 is connected to a supporting assembly 14, such as a scissor or a grasshopper assembly. The supporting assembly 14 is connected in turn to a frame 16 located at ground level. In this embodiment, the loader is provided with a frame, but in other embodiments, the frame could be omitted. The aircraft cargo loader 10 is provided with fluid-driven actuators 18, in this case, hydraulic cylinders, which are provided on both sides of the platform 12 for lifting and lowering the platform 12 relative to the frame 16. One or two hydraulic cylinders 16 may be used on each side of the aircraft cargo loader 10. Hidden by the frame 16, two pairs of wheels 20 are located at the front and rear of the aircraft cargo loader 10, and are connected to the frame 16. The frame 16 can be provided with either front or rear driving wheels 20. The frame 16 is also provided with coil springs 22. The coil springs 22 advantageously accumulate energy when they are compressed between the frame 16 and the platform 12, and transfer it back to platform 12 when the platform 12 is lifted. According to a preferred embodiment of the present invention, the cargo loader is provided with an energy regeneration system as will be described hereinbelow.

Now referring to FIG. 2, a schematic representation of an energy regeneration system 24 is shown according to an embodiment of the present invention. The system 24 comprises a fluid-driven actuator 18, which is preferably a hydraulic cylinder 19. The actuator 18 is connectable between the frame 14 and the elevating platform 12 of an aircraft cargo loader (as shown in FIG. 1), and allows the platform 12 to be raised or lowered, since the actuator 18 can move between an extended and a retracted position. To achieve the extended position, fluid 26 pushes again the piston 28 of the cylinder 19 and extends the shaft 30 of the cylinder 19. Upon receiving a control signal from the main controller 46, a controllable valve 32, such as an on/off solenoid valve, blocks passage of the fluid 26 within the cylinder 18 and therefore maintains it in the extended position. The controllable valve 32 can also allow passage of the fluid 26 outside of the cylinder 19, which will release the pressure applied to the piston 28 of the cylinder 19. The platform pushes against the shaft 30 of the cylinder 18 and thus causes the cylinder 19 to move to its retracted position.

Preferably, fluid 26 exiting the cylinder 19 passes through the opened solenoid valve 32 and is directed to a hydraulic logic block 34. The cylinder 19, the controllable valve 32 and the hydraulic logic block 34 are all linked with tubing 36, into which the fluid 26 may circulate. A hydraulic logic block 34 may include several solenoid valves and a manifold, and is use to direct or route the fluid to and from different hydraulic cylinders, motor-pump assemblies or hydraulic tank, etc.

Preferably, the electric motor pump assembly 38 includes a gear pump 39 and an AC motor 41, having an actuating shaft and a rotor. The electric motor pump assembly may also include several gear pumps and AC motors. In order to regenerate the potential energy accumulated within an extended cylinder 19, the hydraulic logic block 34 routes in priority, upon receiving a given control signal, the fluid 26 exiting the cylinder 18 towards the electric motor pump assembly 38. The gears of pump 39 are thereby set in motion, and since the gear pump 39 is connected to the motor 41 shaft, the motor 41 rotor will rotate and generate a current. This current will be sent, via control means 46, preferably a PLC (Programmable Logic Controller), to a supercapacitor assembly 40, in priority, and then to a battery 42, preferably an 80V DC battery, to recharge it. Supercapacitors 40 have high density energy and are able to accumulate electrical energy rapidly. A control over the flow of current circulating in the regeneration energy system 24 is achieved with a DC/DC converter 56, which are controlled by the control means 46.

Fluid energy exiting the actuator may be stored to be later user for setting the cargo loader in motion. In this case, and still referring to FIG. 2, the main controller 46 controls the hydraulic logic block 34 to route the fluid 26 from the electric motor pump assembly 38 to wheel motors 50, which use the fluid energy to rotate the driving wheels 20. If the energy stored in the supercapacitor assembly 40 is insufficient, the main controller 46 directs electrical energy from the battery 42 to the electric motor pump assembly 38, which will pump fluid back to the wheel motor 50 via the hydraulic logic block 34.

Referring back to FIG. 2, a schematic representation is shown of an aircraft cargo loader 10, including the energy regeneration system described above. In the embodiment illustrated, two hydraulic cylinders 18 are used, one on each side of the aircraft cargo loader 10. Each one of the hydraulic cylinders 18 is connected to an on/off solenoid valve 32, which can either block or allow movement of the hydraulic cylinders 18. Each one of the solenoid valves 32 is a main controller 46. Each solenoid valve 32 is also connected to a hydraulic logic block 34.

Motor pump assemblies 38, preferably comprising AC motors 41, are each independently connected to the hydraulic logic block 34. A motor controller 44 is connected to each one of the AC motors 41 part of the assembly 38, to control their operation. The controllers 44 and a main controller 46 may be distributed over the loader 10 or alternatively, may be centralized within a main controller 46. In this preferred embodiment, one controller 44 may be placed on each side of the aircraft cargo loader in two main control boxes. Of course, other arrangements can be considered. At the front section of the loader 10, a battery 42, in this case an 80V DC battery, is connected to both main control boxes forming the main controller 46. Not shown in the figure, the cargo loader 10 is provided with an operator console and a main electrical box located at ground level. Since the operator console is connected to the main controller 46, an operator can therefore control operation of the cylinders 18, the electric motor 38, the valve 32 and the hydraulic logic block 34, from the operating console.

In operation, referring to FIG. 2, when the aircraft cargo loader 10 is used to raise cargo from the ground level to the aircraft cargo bay level, the main controller 46 directs current from the DC battery 42 and/or supercapacitors 40 to each one of the electric motor pump assemblies 38 via their main individual motor controller 44 (on these controllers input power is DC voltage while output power is AC voltage). The AC motors 41 drive their associated gear pumps 39, each pump 39 thereby pushing hydraulic fluid 26 into each one of the hydraulic cylinders 18 via the hydraulic logic blocks 34 and the solenoid valves 32. Of course, appropriate control signals from the main controller 46 must be sent to configure the hydraulic logic block 34 and the solenoid valve 32 accordingly. The hydraulic force of fluid 26 acting on the hydraulic cylinder piston 28 lifts the platform 12. Speed and acceleration of the platform's movement can be controlled by the main controller 46 through each motor controller 44. The speed will be limited depending on the battery current to limit the instantaneous current drawn from the battery 42. Once the desired height of the platform 12 is reached, a control signal is sent from the main controller 46 to the electric motor-pump assembly 38 in order to stop the movement of the hydraulic cylinder 18.

Cargo from the platform can then be unloaded from the platform and loaded into the aircraft cargo bay. Conveying elements, such as rollers and transport chains, located on the surface of the platform, are used to move cargo over the platform. Movement of such conveying elements can be obtained using a main AC pump 48, also connected to and controlled by the main controller 46. Energy from the DC battery 42 is used to power the main AC pump 48 via its motor controller.

Once the cargo is unloaded, a control signal generated by the main controller 46 in response to a user command input from an operator, is sent to the on/off controllable solenoid valves 32. Upon reception of the signal, the valves 32 open so that the hydraulic fluid 26 may exit the hydraulic cylinders 18 to lower the platform 12. As previously explained, the hydraulic logic blocks 34 will, in priority, route the hydraulic fluid 26 through the AC motor pump assemblies 38 so that the fluid energy may be converted to electrical energy and sent to the supercapacitors 40 via the DC/DC converters 56. Hydraulic fluid energy from the lowering of the platform will be used to drive the gear pump 39 (and the AC motor 41, acting as a generator) until the supercapacitor assembly 40 is fully charged. If the supercapacitor assembly 40 is already fully charged, or reaches its full charge during the lowering of the platform, the DC/DC converter 56 will redirect the regeneration toward the battery. The DC/DC converters 56 use a voltage sensor at the supercapacitors to determine the management of the battery charging. Just as when the platform is lifted, the speed and operation of the electric motors 38 can be controlled via the motor controllers 44 to manage the descent of the platform.

As schematically shown, two coil springs 22 can be connected to the frame of the aircraft cargo loader 10. The springs 22 are in a contracted position when the aircraft cargo loader is completely lowered, thus accumulating or storing potential energy. This potential energy can be transferred back to the platform when it is lifted, thus advantageously reducing the energy required from either the battery 42 and/or the supercapacitors 40, to lift the platform. Of course, a different number of coiled springs 22 or a different type of springs can be used instead.

The system further includes a lift moto-pump group (motor controller, motor and pump) dedicated for the rear platform lift and drive and an accessories moto-pump group 48 to power all functions which may include the rear platform lift but not the drive.

Still referring to FIG. 2, the aircraft cargo loader 10 as shown is provided with two driving wheels 20, located at the front section of the loader. The driving wheels 20 are used to move the cargo loader 10. Each one of the driving wheels 20 is directly mounted onto a wheel motor 50, the wheel motor 50 being connected, in turn, to one of the hydraulic logic blocks 34. In this preferred embodiment, a piston wheel motor 50 is used as the wheel motor-50. The driving wheels 20 are connected to a steerable axle and are also each provided with a drum brake hub 54. From the operator's console, a main hydraulic drive circuit can be controlled to engage or disengage the driving wheels 20 and manage their speed. Preferably, the main hydraulic drive circuit will engage the driving wheels 20 only when the platform 12 is stopped and in its lowered position.

To set the loader 10 in motion, a control signal is sent from the main controller 46 to the hydraulic logic blocks 34 to route fluid 26 to the wheel motor 50. The compressed fluid sets the piston wheel motor 50 in motion, which thereby drives the wheels 20. The electric motor pumps 38, in combination with the main AC pump 48, are used to push fluid towards the piston wheel motor 50 in order to move the cargo loader 10. Energy from the supercapacitors 40 and/or the battery 42 can be used to power the electric motor pumps 38 in combination with the main AC pump 48.

To slow down or stop the aircraft cargo loader 10, the piston wheel motors 50 are used. Of course, during this operation, control of the piston wheel motor 50 is achieved via the main controller 46. For the embodiment presented in FIG. 2, an AC pump 38, in combination with the main AC pump 48, are used to feed the wheel motors 50. Another AC pump 38 is used to act as a restrictor on the output flow coming out of the wheel motors 50. The control system 46 can therefore send a signal via the AC controller 44 to the "feed pumps" to slow down, while increasing the resistance at the "restrictor pumps" That way, some energy can be recovered from the restrictor pumps, and be restored to the battery 42 and/or supercapacitors 40.

As a possible option, in other embodiments of the loaders, two AC pumps 38 in combination with the main AC pump 48 can be used to feed the wheelmotors 50. Two other AC pumps 38 are used to act as restrictors on the output flow coming out the wheelmotors. In cases where an immediate response is required, the drum brake hubs 54 can also be used, via service brake pedal.

As already mentioned, a main AC pump 48 is used for all other hydraulic functions required by the aircraft cargo loader 10. The main AC pump 48 is fed from the battery 42 and/or supercapacitors via a controller 44 controlled by the main controller 46, which is preferably a CAN (Controller Area Network) controller 44. Such other functions include the movement of all the conveying elements, as well as the movement of stabilizers and moveable sliders, which is performed via the AC pump 48. It should be noted that although using an AC pump is preferred, using a DC pump may also be considered.

Figure 3A:
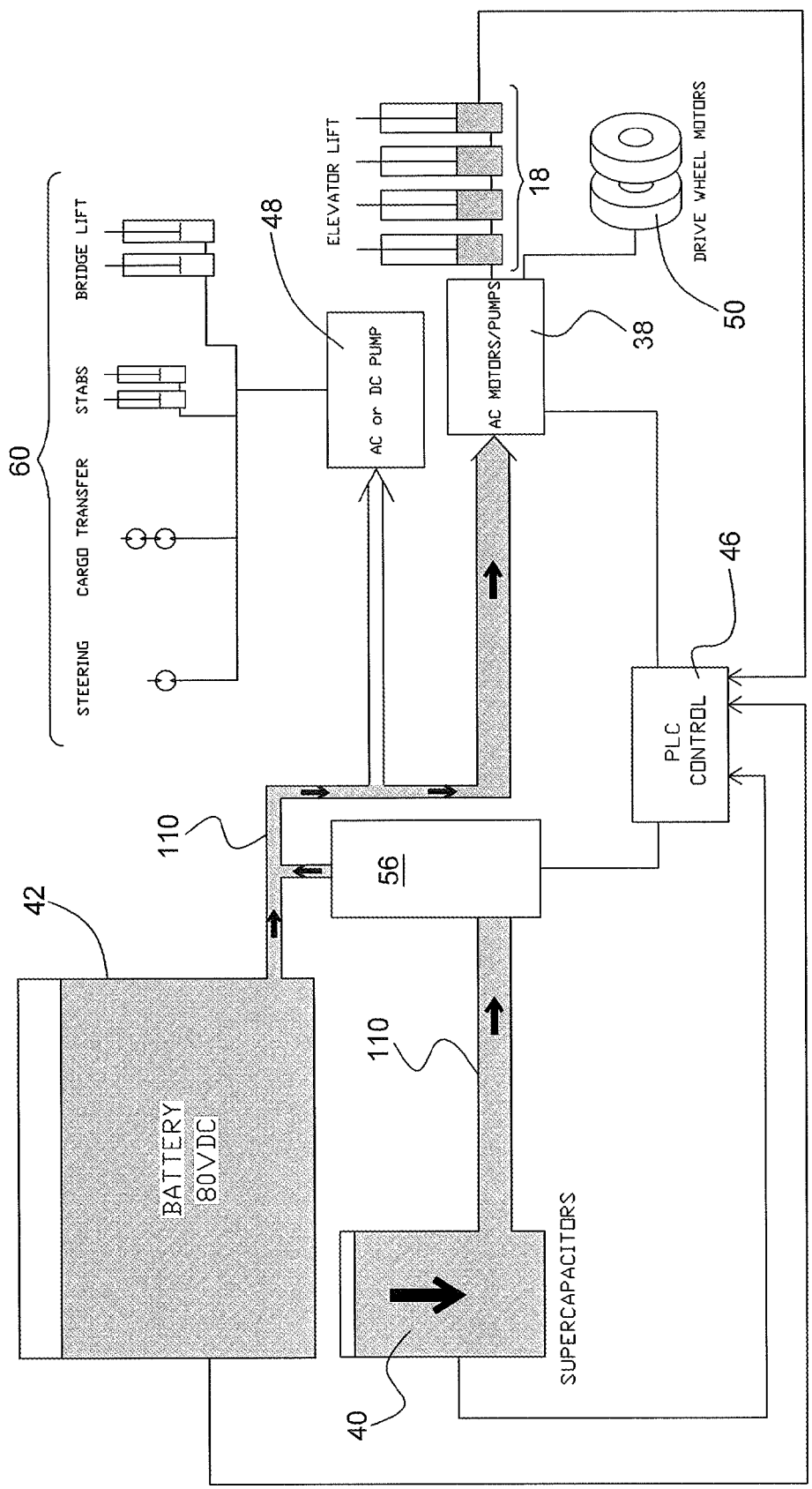
FIG. 3A is a schematic block diagram showing elements of an energy management system according to an embodiment of the present invention, at a given moment.
Figure 3B:
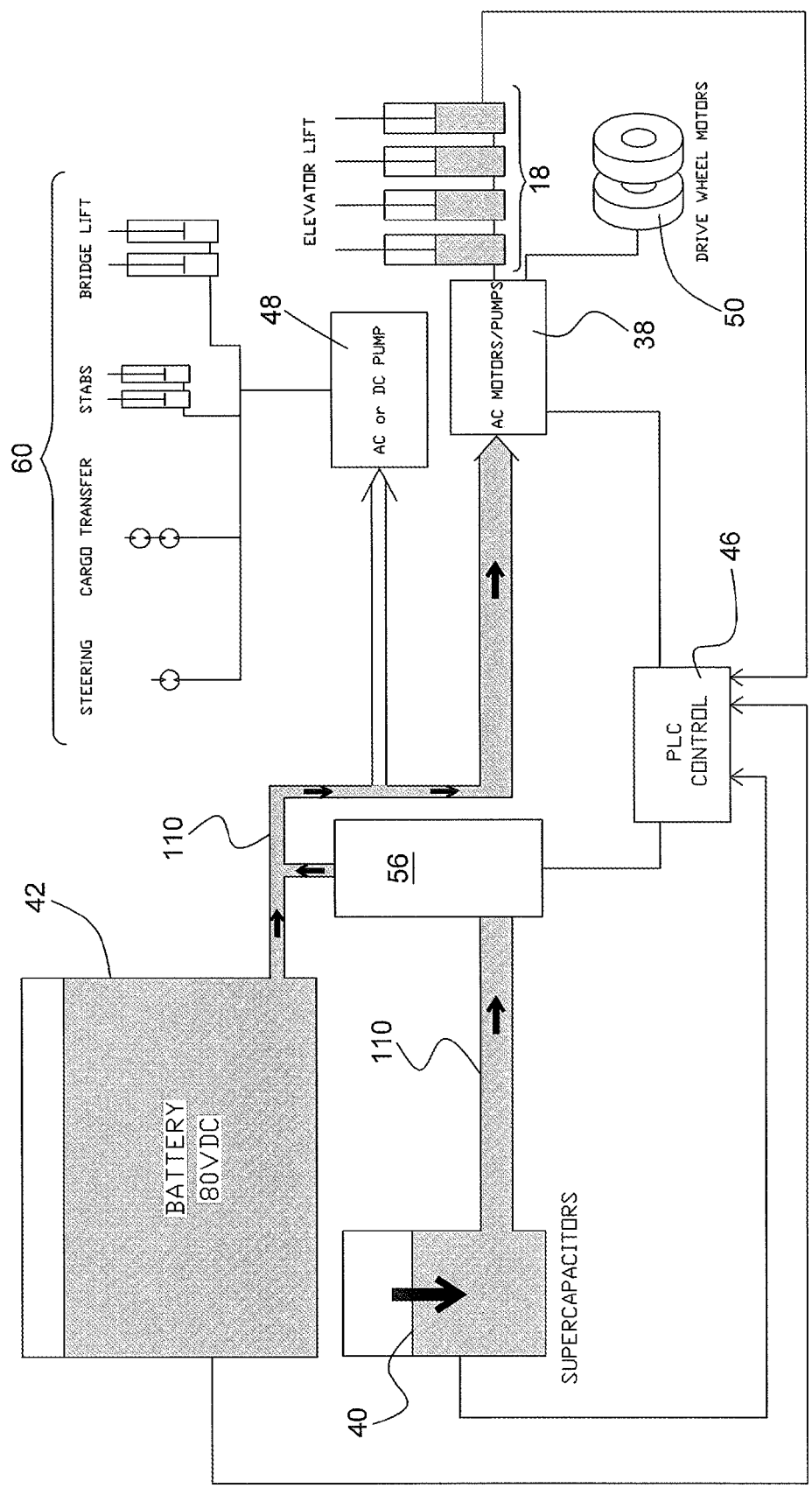
FIG. 3B is a schematic block diagram showing elements of an energy management system according to the embodiment shown in FIG. 3A, at another given moment.
Figure 3C:
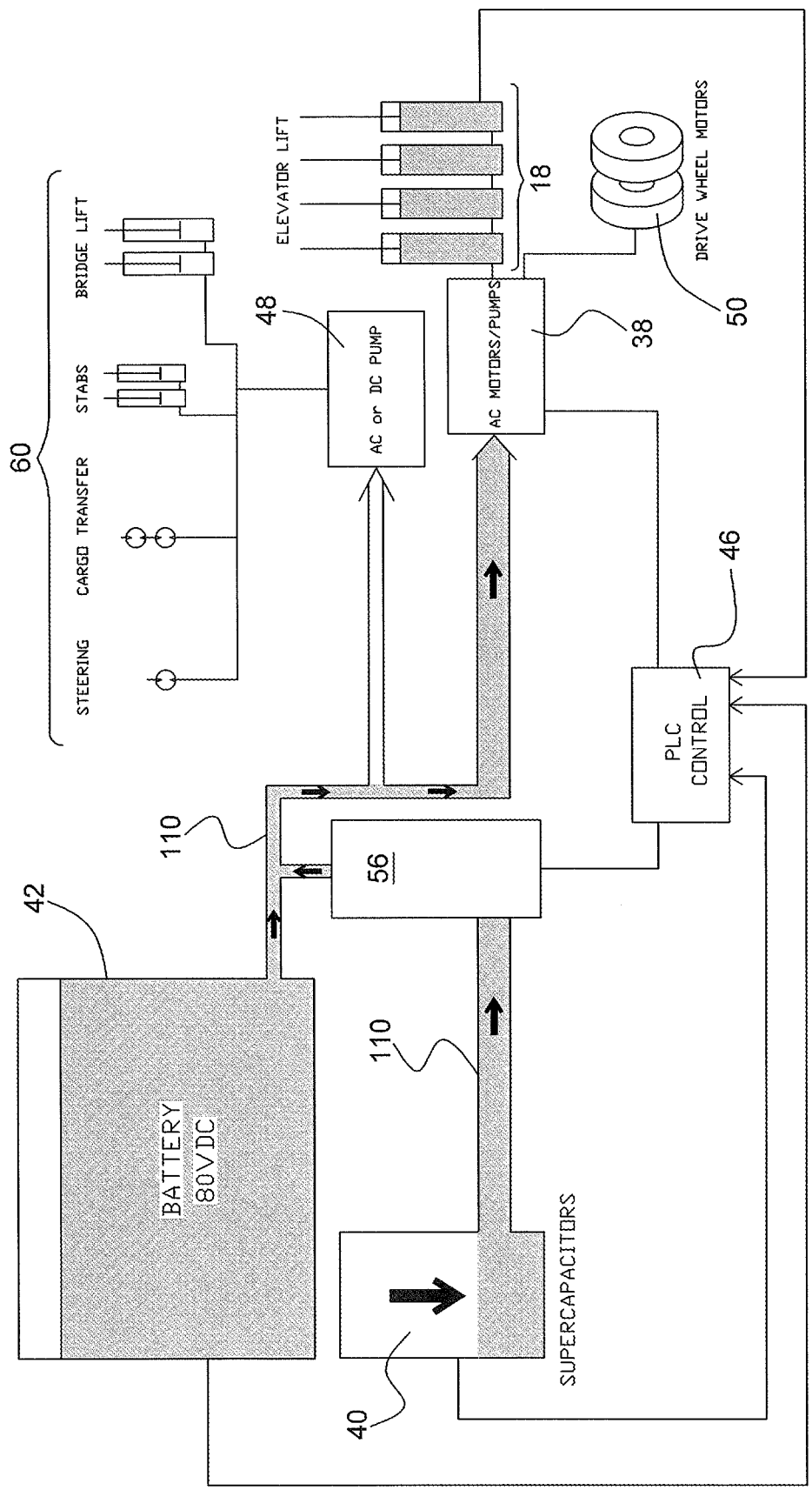
FIG. 3C is a schematic block diagram showing elements of an energy management system according to the embodiment shown in FIG. 3A, at another given moment.

Referring now to FIG. 3A to 3G, a broad description of the operation of the system will be given. The different steps involved in the regeneration energy process are presented. As shown in FIGS. 3A and 3B, a portion of the energy required to lift the actuators 18 is provided by the supercapacitors 40, while the rest of the energy is supplied by the DC battery 42. The flow of current coming from the supercapacitors 40 and the battery 42 is controlled by an electric motor controller 44, being provided in an AC motor pump assembly 38, and by the DC/DC converter 56. The AC motor pump assembly 38 uses the current to drive the motor 41, which will in turn activate the pump 39 to push fluid into the actuators 18, thereby raising the platform 20 (see FIG. 1). As shown in FIG. 3C, the supercapacitors 40 have the capacity to supply energy much faster than the DC battery 42.

Figure 3D:
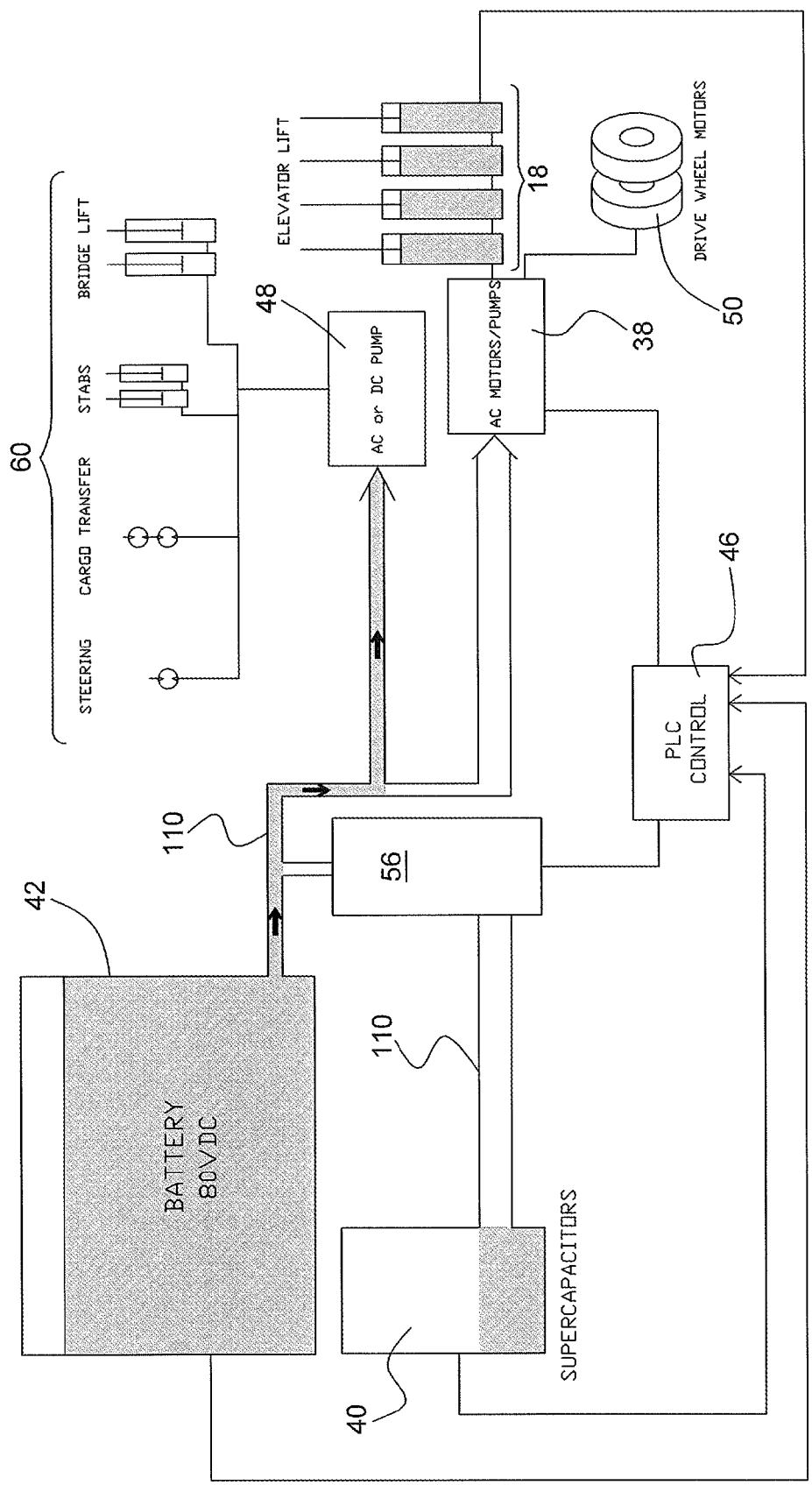
FIG. 3D is a schematic block diagram showing elements of an energy management system according to the embodiment shown in FIG. 3A, at another given moment.

Referring to FIG. 3D, once the platform 12 is elevated, transfer of cargo loaded on the platform 12 is achieved by use of the pump 48, which is fed by the DC battery 42. Other functions 60 such as steering, cargo transfer, platform stabilization and bridge lifting may each be powered by the battery 42 and pump 48, or according to an alternative embodiment these secondary functions 60 may be powered by the supercapacitors 40 and/or the battery 42, similarly to the motor assembly 38.

Figure 3E:
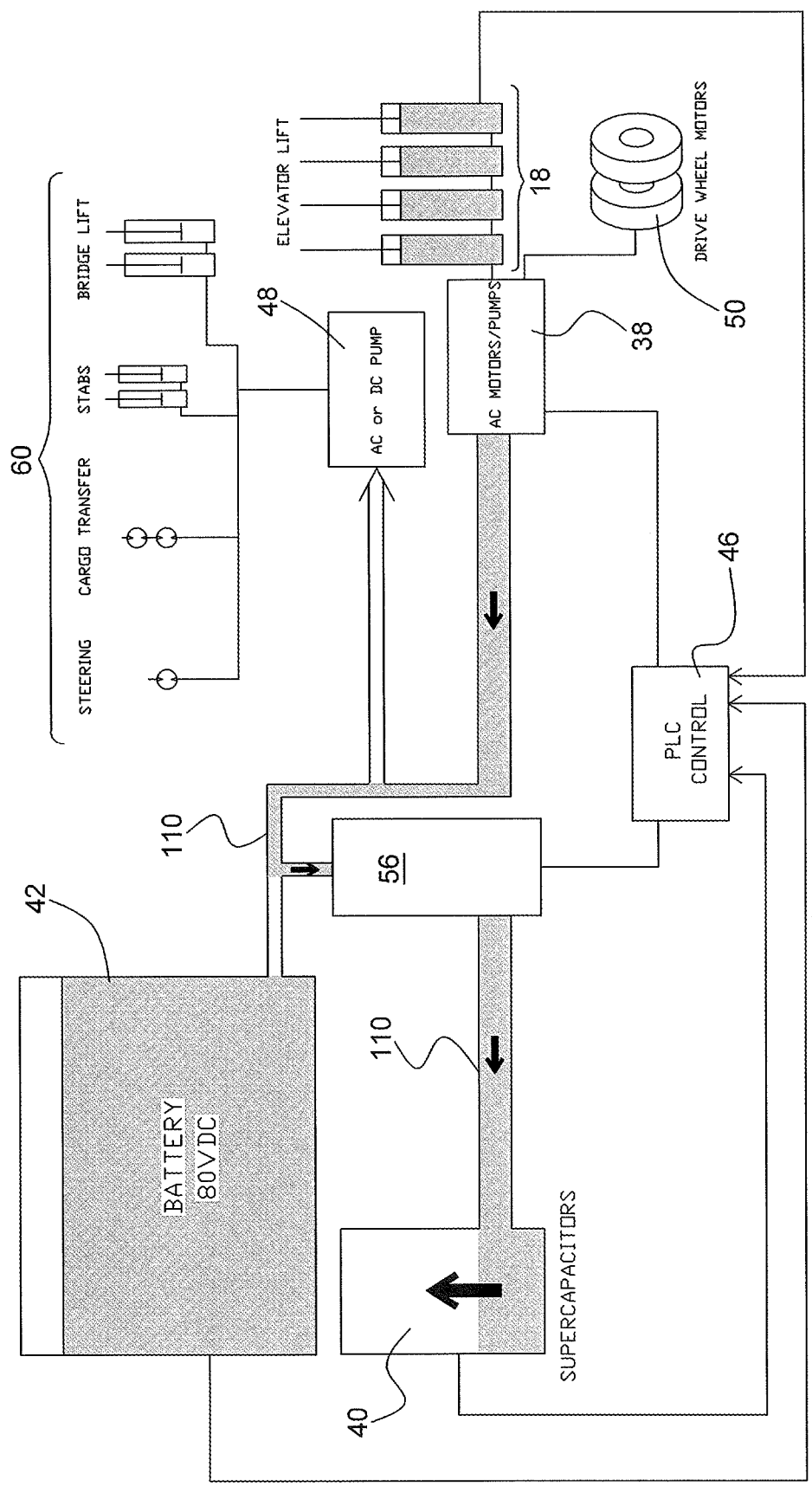
FIG. 3E is a schematic block diagram showing elements of an energy management system according to the embodiment shown in FIG. 3A, at another given moment.
Figure 3F:
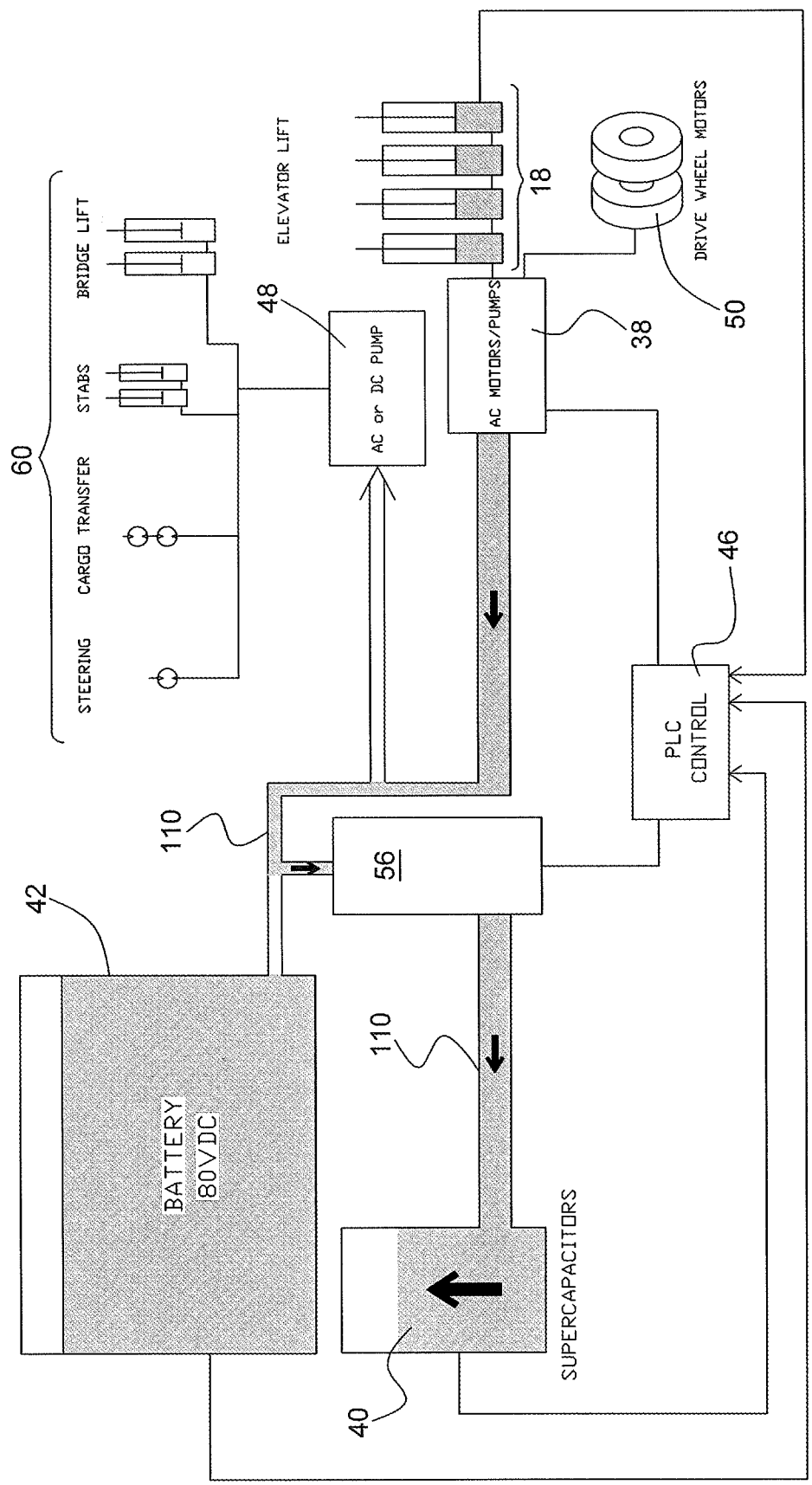
FIG. 3F is a schematic block diagram showing elements of an energy management system according to the embodiment shown in FIG. 3A, at another given moment.

Once the cargo is unloaded, the platform may be lowered, as shown in FIGS. 3E and 3F. The electric motor controller 44 of the AC motor pump assembly 38 directs the current generated by the AC motor pump assembly 38 to recharge the supercapacitors 40, via the DC/DC converter 56, and then to the battery 42. Hydraulic power is thus converted into electrical power. The supercapacitors 40 may or may not be fully recharged at this point, depending on the load present on the platform during its lowering.

Figure 3G:
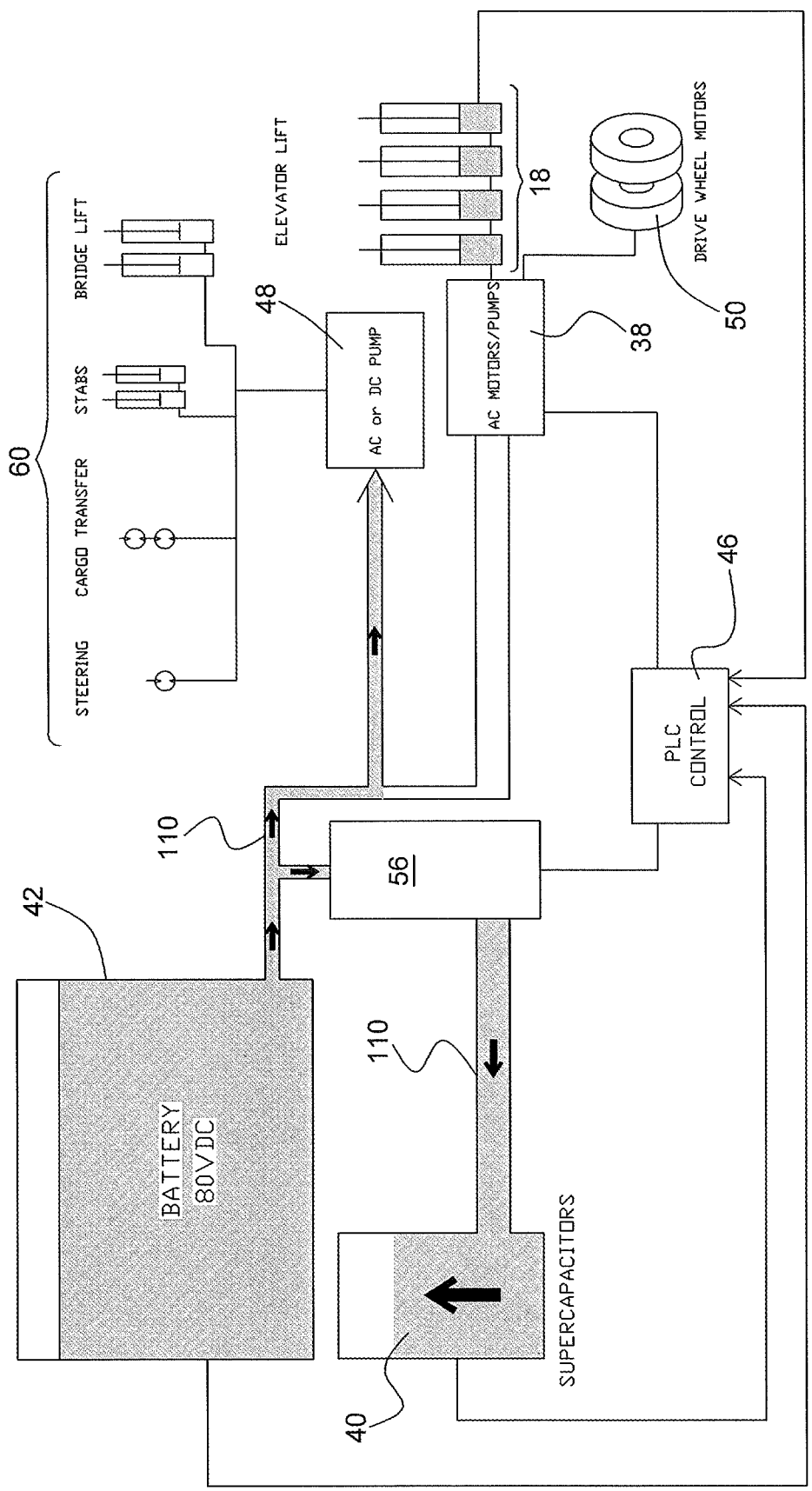
FIG. 3G is a schematic block diagram showing elements of an energy management system according to the embodiment shown in FIG. 3A, at another given moment.

Referring now to FIG. 3G, once the platform is lowered, a cargo can be transferred onto it. At this step, energy from the battery 42 is used to power the AC motor pump assembly 48, but also to recharge the supercapacitors 40, until it is fully loaded and ready for the next platform lift.

Figure 4:
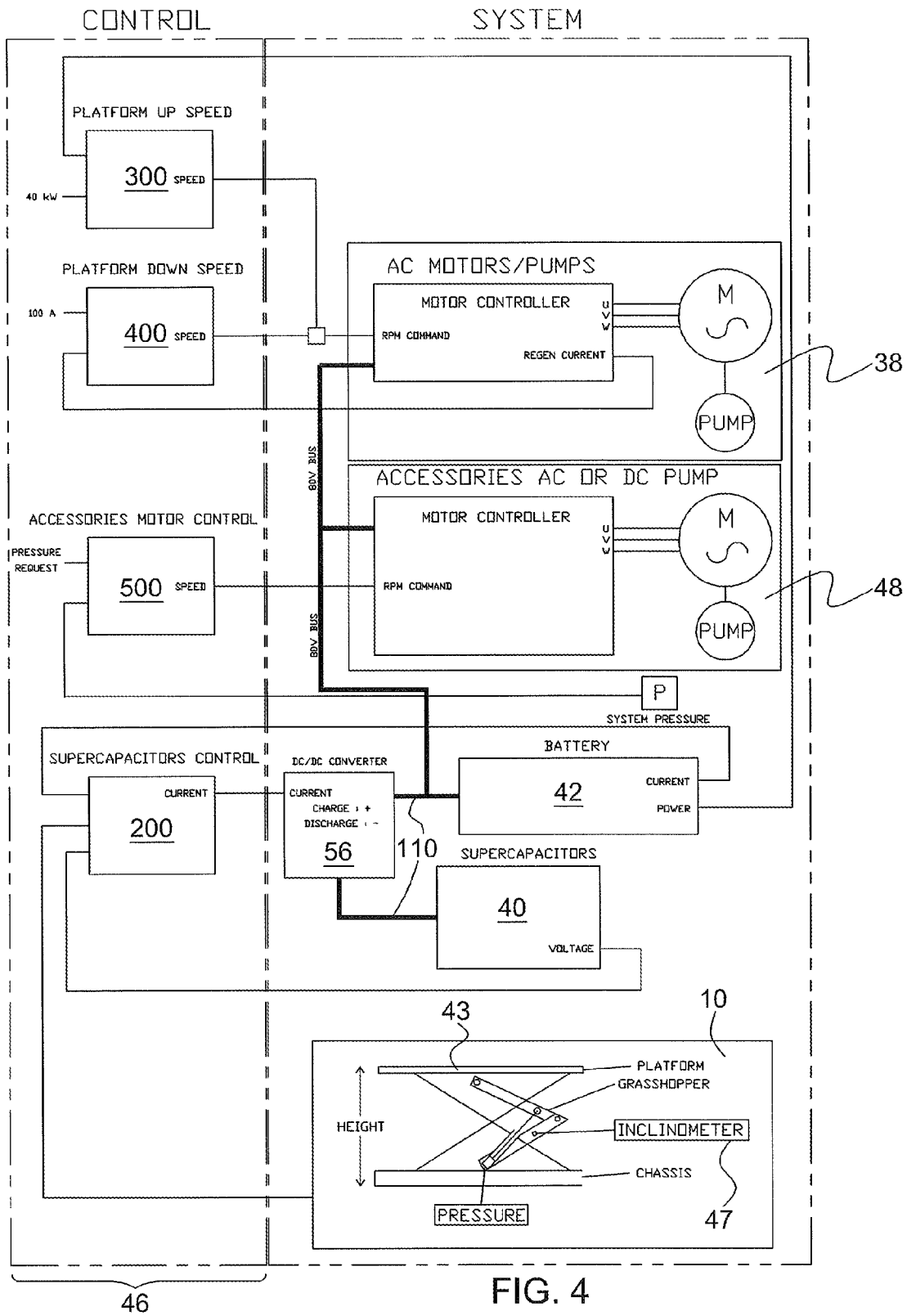
FIG. 4 is a block diagram showing four closed-loop control systems, according to an embodiment of the present invention.

The control of the flow of current circulating in the regeneration energy system is achieved with the DC/DC converter 56. Referring to FIG. 4, a main PLC 46 is connected to the DC/DC converter 56 and thereby manages, in response to input signals received from different sensors located in the system, the flow of current exchanged between the electric motor controller of the AC motor pump assembly 38, the supercapacitors 40 and the battery 42, all of which are connected by a DC bus 110. Indeed, current law determines the current in each line, in that the current in a junction is equal to the sum of the current in each branch.

Preferably, referring still to FIG. 4, as well as FIG. 3A, the main PLC 46 executes a decision matrix via different closed-loop controllers, corresponding namely to a platform-raising loop 300, a platform-lowering loop 400, an accessories-control loop 500 and the supercapacitor-control loop 200. More particularly, the platform-raising loop 300 performs a method in order to generate a command signal, corresponding for example to a motor speed in rotations per minute (rpm) and a direction, to be sent to motor assembly 38 to raise the platform of the loader. Moreover, the platform-lowering loop 400 performs a method in order to generate a command signal, corresponding for example to a motor speed in rpm and a direction, to be sent to motor assembly 38 to lower the platform of the loader. Moreover, the accessories-control loop 500 performs a method in order to generate a command signal, corresponding for example to a motor speed in rpm and a direction, to be sent to motor assembly 48 to supply accessory functions. Furthermore, the supercapacitor-control loop 200, performs a method in order to generate a command to the DC/DC controller which inturn controls the flow of current between the supercapacitors, the battery and a motor 38 (and/or 48), as will be better explained hereinbelow.

Each of those four closed-loop controllers performs a method that may be executed independently from the methods of the other closed-loop controllers. Moreover, one or more of these controllers may be provided on the cargo loader and may further cooperate together in order to provide a more optimal management of the battery on a machine such as a cargo loader.

For example, when the platform lift speed is increased, the battery current increases and as a consequence the DC/DC converter steps in to lower this battery current as much as possible. At the same time, if the accessories pump is activated, the battery current is increased. The PLC will try to lower the platform lift speed in order to reduce the total battery power required. This is a continuous real-time process and the system preferably adapts to the changing conditions.

Each of the control loops 200, 300, 400 and 500 operates so as to control respective parts of the system, each having a particular objective toward which the respective closed loop system tend based on particular system conditions. When one control loop changes a parameter value, it may affect the other parts and gradually, the system stabilizes in a most optimal state, or at least close to the optimal state.

Thus, in order to achieve the respective objective, the closed loops apply the previously introduced principles, namely (1) the Peukert effect, (2) power loss in cables and components, and (3) battery charging/discharging, in order to optimize the battery life.

These principles, will now be better explained, in view of an example of application according to a particular embodiment of the present invention.

As previously mentioned, based on the Peukert effect, discharging the battery slower or faster increases or reduces the available energy from the battery. The Peukert equation quantifies this phenomenon. As also explained, the following formula shows the relationship between the battery measured discharge current and the battery energy removed:

$$I_{adjusted} = I^n C / (R(C/R)^n),$$

wherein
- $I_{adjusted}$ is a discharge current equivalent to energy taken out of the battery,
- I is a measured discharge current,
- n is an exponent related to the battery construction and age,
- R is a battery hour-rating, and
- C is a battery capacity.

The capacity of a battery is rated in amp-hour (Ah). For instance, the battery used according to an embodiment of the present invention may be a 1,000 Ah over 6 hours. This means that the battery may be discharged at a rate of 1,000 Ah/6 h=167 A. The number of hours is important because it determines the energy available over a certain period of time.

Given that the battery rating is 1,000 Ah over 6 hours, the above-formula is applied as follows:

$$I_{adjusted} = (167\ A)^n \times 1{,}000\ Ah / (6\ h\ (1{,}000\ Ah/6\ h)^n)$$
$$= (167\ A)^n \times 1{,}000\ Ah / (6\ h\ (167\ A)^n)$$
$$= 1{,}000\ Ah / 6\ h$$
$$= 167\ A$$

The formula shows that if the battery is discharged at a rate of 167 A, it will last 6 hours and 1,000 Ah of energy will be delivered. However, a cargo loader generally requires much more than 167 A.

The following table shows the Peukert current (see columns 2, 3 and 4) for different values of n and measured current (see column 1). For the current application, C=1,000 Ah and R=6 hours.

| Current I (A) | Peukert exponent (n) | | |
|---|---|---|---|
| | 1.1 | 1.2 | 1.3 |
| 200 | 204 | 207 | 211 |
| 600 | 682 | 775 | 881 |
| 1000 | 1196 | 1431 | 1712 |

For example, if the battery current measured is 600 A, in reality an equivalent of 775 A is extracted from the battery (n=1.2) or in other words 29% of the expected energy is lost. The value of n is unknown as it is different for each battery but is typically of approximately 1.3 for lead-acid batteries.

Thus, in order to reduce the power losses in the present system, the battery current is preferably minimized.

As also mentioned above, power loss in the electrical cables and components is expressed by the following formula:

$$P = RI^2,$$

wherein
- I is the current in Amperes (A), and
- R is the resistance of the cable or component in Ohms.

Thus, the power loss (dissipated heat) is proportional to the square of the current.

The resistance of copper for a cable of size 2/0 is approximately 0.261 mOhm/m. Moreover, the resistance of a MOSFET in the present motor controller is 5 mOhm.

The following table shows the number of watts lost for a cable of size 2/0 having a resistance of approximately 0.261 mOhm/m and a MOSFET in the motor controller, having a resistance of approximately 5 mOhm.

| Current I (A) | Total power at 80 V (W) | Power loss (W) | |
|---|---|---|---|
| | | Cable 1 m 0.261 mOhm | MOSFET 5 mOhm |
| 100 | 8000 | 3 | 50 |
| 250 | 20000 | 16 | 313 |
| 500 | 40000 | 65 | 1250 |

For twenty (20) meters of cables to connect the motor and the battery, the power loss at 250 A versus 500 A is 320 W (or 320/20,000=1.6%) compared with 1,300 W (or 1,300/40,000=3.2%). Therefore, in order to reduce the power losses, the current in components must be minimized.

As also previously explained, frequent charging and discharging of a battery also impacts efficiency. Indeed, an energy regeneration system using only a rechargeable battery to cooperate with a vertically movable lift may amplify the Peukert effect, since charging the battery for a short period of time and then discharging it right after, or the other way around, causes the battery to be seen as being much smaller.

As also explained, the battery further generates heat when charging and discharging, which represents lost energy. The battery temperature increase caused by charging the battery also reduces its life.

For the above reasons, the battery is preferably not recharged intermittently (i.e. too quickly discharge and recharged, and so on and so forth) in order to reduce the power loss.

Thus, the energy management system according to the present invention, preferably applies the above principles in order to provide a more optimal system, namely by virtue of the DC/DC converter and supercapacitors. More particularly, in order to optimize the system and increase the efficiency and battery life, the battery power is managed by controlling the current required by the motors, the current drawn through the DC/DC converter is managed, the current drawn from the battery is leveled over time, and the regenerated energy is stored into the supercapacitors in order to avoid recharging the battery too readily during operation.

As previously mentioned, the overall system seeks to maintain the battery current as low as possible by controlling the motor's speed and by controlling the current flowing through the DC/DC converter. The system also preferably seeks to manage the energy flow between the battery, motors and supercapacitors so that the battery power demand is constant over time, and to store the regenerated energy into supercapacitors in order to avoid recharging the battery during operation, as well as to maintain the supercapacitors energy level as high as possible.

As also mentioned previously, the system is operated by closed-loop controllers 300, 400, 500 and 200, as better illustrated in FIG. 4. The algorithms performed by each of these loops, according to preferred embodiments will now be described, starting with the main closed-loop controller 200.

Referring to FIG. 5, as well as FIGS. 1 and 4, there is shown the energy management method which is performed by the main closed-loop controller 200 for determining the current to be supplied to or to be drawn from the supercapacitors 40 and the battery 42, by the DC/DC converter 56, according to a preferred embodiment of the present invention. A general objective sought from the DC/DC converter 56 is to suitably reduce the battery current when the system power demand is high and to suitably absorb the regenerated energy when the platform is lowered.

1) The method preferably includes, determining a target battery current as follows:

(i) Reading a voltage $V_{cap}$ at the terminals of the supercapacitors 40, a movement of the platform 12, selected from the group comprising upward movement, downward movement and no movement, and a status of the loader (10) selected from the group consisting of powered and shutdown, and determining 201 an operation mode as follows:

If the supercapacitor voltage is lower than 30 V, setting the operation mode to "precharge mode";

If the supercapacitor voltage is greater than 30 V and the movement of the platform corresponds to an upward movement, setting the operation mode to "upward mode";

If the supercapacitor voltage is greater than 30 V and the movement of the platform corresponds to a downward movement, setting the operation mode to "downward mode";

If the supercapacitor voltage is greater than 30 V and the movement of the platform corresponds to no movement, setting the operation mode to "recharge mode"; and If the power status of the loader is shutdown, setting the operation mode to "discharge mode".

(ii) Determining 202 a battery current target based on the mode of operation determined above, as follows:

If the mode of operation is "precharge mode", the battery current target is set to 50 A. Indeed, in the "precharge mode" it is an objective to preload the supercapacitors 40 up to 30V when the loader system has just been turned on. The supercapacitors 40 and DC/DC converter 56 are more efficient at higher voltages, therefore a minimal supercapacitor voltage is preferable.

If the mode of operation is "upward mode", the battery current target is set to 200 A. Indeed, in the "upward mode" it is an objective to use the supercapacitors' energy to reduce the battery current required. Since 200 A is the battery current target, if the battery current exceeds 200 A because of the system demand, the DC/DC converter 56 will transfer energy from the supercapacitors 40 to reduce the battery current.

If the mode of operation is "downward mode", the battery current target is 150 A. Indeed, in the "downward mode" it is an objective to load the supercapacitors 40 with the regenerated energy. Thus with a battery current targeted at 150 A, the regenerated energy may be captured and at the same time, the supercapacitors 40 may be recharged up to a maximum energy level, which is determined at step 210 described below, and this, only when the battery current is not too elevated.

If the mode of operation is "recharge mode", the battery current target is 150 A. Indeed, in the "recharge mode" it is an objective to fill up the supercapacitors 40 when the loader platform 12 is not moving. 150 A is the battery current target, to recharge the supercapacitors 40, according to this particular embodiment.

If the mode of operation is "discharge mode", the target battery current is −150 A. Indeed, in the "discharge mode" it is an objective to empty the supercapacitors 40 when the loader 10 is turned OFF (shutdown state). −150 A is the battery current target since it is the maximum capacity of the DC/DC converter 56 to discharge the supercapacitors 40, according to this particular embodiment.

If there is another demand for a battery current which is greater than 150 A, then the system will wait before recharging the supercapacitors.

Thus, the above two (2) substeps may be summarized as follows:

detecting a movement of the lift element, said movement being selected from the group consisting of a lifting movement, a lowering movement and an immobile movement;

providing a voltage $V_{cap}$ detected at terminals of the energy storage device, namely the supercapacitors 40;

calculating 202 a battery current target based on at least one of the voltage $V_{cap}$ and the movement detected, more particularly:
  detecting a power state of the machine, namely cargo loader 10, said power state being selected from the group consisting of a powered state and a shut-down state; and
    if the voltage $V_{cap}$ is lower than 30 V, setting the battery current target to 50 A (i.e. precharge mode);
    if the voltage $V_{cap}$ is greater than 30 V and the movement detected at (a) is the lifting movement, setting the battery current target to 200 A (i.e. upward mode);
    if the voltage $V_{cap}$ is greater than 30 V and the movement detected at (a) is the lowering movement, setting the battery current target to 150 A (i.e. downward mode);
    if the voltage $V_{cap}$ is greater than 30 V and the movement detected at (a) is the immobile movement, setting the battery current target to 150 A (i.e. recharge mode); and
    if the power state detected corresponds to a shut-down state, setting the battery current target to −150 A (i.e. discharge mode).
  The method further includes adjusting 204, using a PID controller 108, a current drawn from the battery source by the energy-storage-device controller, namely by the DC/DC converter, according to the battery current target determined above.
2) Another step, as previously mentioned, comprises measuring 211 an angle using a sensor, such as an inclinometer 47; and determining a height H of the platform 12 as a function of the angle measured by the inclinometer 47. The inclinometer 47 is suitably mounted on or connected to the supporting assembly 14, for example a member of the grasshopper support, and the angle measured is thus representative of corresponding an angle of the member. The height may thus be determined by means of a table of correspondence. Alternatively, the height may be obtained in a number of ways, including for example from a distance sensor, information received from the PLC or any other controller which calculates a height based on the motor's operation. For example a number of rotations of the motor in one direction may be representative of an increase in height while a number of rotations of the motor in the opposite direction may be representative of a decrease in height.
3) Another step of the method includes, as previously mentioned, calculating 214 a minimum energy $E_{min}$ required in the supercapacitors 40 as a function of the height H of the lift element 12, namely according to the following equation:

$$E_{min}=E\text{cap}_n+(E_{total}-E\text{cap}_n)/(H_{total})\times H,$$

wherein
  $E_{min}$ may be provided in Joule units (J);
  n is a constant having a value based on a parameter of the energy-storage-device controller, and a voltage of the battery;
  $E\text{cap}_n$ represents an energy available in the energy storage device at n Volts, and may be provided in Joule units (J);
  $E_{total}$ represents a maximum energy which is storable in the energy storage device, and may be provided in Joule units (J); and
  $H_{total}$ is a maximum height the lifting element may reach, and may be provided for example in millimeters (mm).
  Thus in the present case, the equation is applied as follows:

$$E_{min}=E\text{cap}_{40V}+(E_{total}-E\text{cap}_{40V})/(H_{total})\times H,$$

wherein
  $E\text{cap}_{40V}$ is the energy available in the supercapacitors 40 at 40V and is set to 80,000 J,
  $E_{total}$ is the maximum energy which can be stored in the supercapacitors 40 and is set to 320,000 J, and
  $H_{total}$ is set to 3,000 mm.
  Therefore, $$E_{min} = 80{,}000 \text{ J} + (320{,}000 \text{ J} - 80{,}000 \text{ J})/3{,}000 \text{ mm} \times H$$
$$= 80{,}000 \text{ J} + 80 \text{ J/mm.}$$

4) Another step of the method includes, as also previously mentioned, calculating 216 an energy $E_{available}$ stored in the energy storage device based on a voltage $V_{cap}$ detected at terminals of the energy storage device and on a parameter of the energy storage device, namely according to the following equation:

$$E_{available}=(\text{Capacity}\times V_{cap}\times V_{cap})/2.$$

Thus in the present case, the above-mentioned parameter is a Capacity of the supercapacitors 40, which is provided in Farads and set to to 100 F.

5) Yet another step of the method includes, as also previously mentioned, calculating 218 an error Error where Error=$E_{min}-E_{available}$.
  Thus in the present case, the error Error corresponds to an amount of energy that may be used to feed the AC motor pump assembly 38 in the upward mode of operation, (i.e. when the movement detected is the lifting movement), or how much additional energy may be stored into the supercapacitors when the movement detected is a lowering movement of the platform.
  Yet another step 206 of the method includes, as also previously mentioned, setting a lower limit $I_{min}$ of a current to be drawn from the energy storage device to 0 A when the movement previously detected is the immobile or lowering movement. In other words, the lower limit $I_{min}$ is set to 0 A, if the mode of operation previously determined is "recharge mode", "precharge mode" or "downward mode", and this, in order to ensure that the supercapacitors 40 are not discharged in those modes, namely for maintaining this energy available for a platform lifting movement. Moreover, the current of the DC-DC converter is limited to 150 A. The current is therefore limited on the battery side because the voltage is always higher than on the supercapacitor side, given that the power on both sides is approximately the same. The current on the battery side of the DC/DC converter is limited to 150 A$\times V_{cap}$ $V_{bat}$. For example, for a $V_{cap}$ of 70 V and a $V_{bat}$ of 80 V, the power on the supercapacitors' side is 70 V$\times$150 A=10500 W, while the current on the battery side is 10500 W/80 V=131 A.
  As also previously mentioned, the lower limit $I_{min}$ is calculated as a function of Error when the movement detected is the lifting movement, more particularly, according to:

if Error<0 and Error>−2 then $I_{min}=Error\times 75\times V_{cap}/V_{bat}$ otherwise, if Error<=−2

$I_{min}=-150\times V_{cap}/V_{bat}$ otherwise, $I_{min}=0$, wherein,
the method further includes detecting a voltage $V_{bat}$ at terminals of the battery source.

Preferably, another step includes detecting a power state of the machine, said power state being selected from the group consisting of a powered state and a shutdown state; and setting the lower limit $I_{min}$ of said current to be drawn from the energy storage device to −150 A when the power state detected is a shutdown state. In other words, the lower limit $I_{min}$ is set to −150 A if the mode of operation previously determined is "discharge".

In recharge, precharge and down modes, the minimum current is limited to 0 A to make sure that the supercapacitors are not discharged in those modes to keep this energy for the platform lift up movement. The current on the battery side of the DC/DC converter is limited to 150 A×$V_{cap}/V_{bat}$.

6) Still another step 220 of the method includes, as also previously mentioned, calculating an upper limit $I_{max}$ of a current to be supplied to the energy storage device as a function of Error when the movement is the immobile or lowering movement. More particularly, in the present case, the maximum current $I_{max}$ to be supplied to the supercapacitors 40 by the DC/DC converter 56 is calculated according to the following algorithm:

if Error>0 and Error<2 then $I_{max}=Error\times 75\times V_{cap}/V_{bat}$ otherwise, if Error>=2

$I_{max}=150\times V_{cap}/V_{bat}$ otherwise, $I_{max}=0$.

In other words, $I_{max}$ is determined based on how much energy is missing, namely how much additional energy may be stored into the supercapacitors 40, such that if the energy stored in the supercapacitors 40 is equal to the energy target level, as defined at number 218, the current will be equal to 0 A so as to stop recharging the supercapacitors 40.

7) Yet another step 222 of the method includes, as also previously mentioned, controlling the energy-storage-device controller as a function of $I_{min}$, $I_{max}$ and the movement previously detected, in order to manage the current flow between the energy storage device and the power supplying bus. More particularly, in the present embodiment, if the current drawn from the battery 42 by the DC/DC converter 56 is lesser than the lower limit $I_{min}$, then the current is set to $I_{min}$, and if the current drawn from the battery 42 by the DC/DC converter 56 is greater than the upper limit $I_{max}$, then the current is set to $I_{max}$.

Advantageously, the PLC adjusts the supercapacitors' 40 energy level so that at any time it is possible to store into the supercapacitors 40 all or most of the potential energy that can be regenerated, namely by taking into account the height H of the platform.

Indeed and for example, when the platform is at ground level, there is no potential energy to regenerate since the platform is at the lowest position. When the platform is at maximum height, the potential energy that can be regenerated with a platform fully loaded is 133 kJ, based on a system model. The energy capacity of a supercapacitor of 100 F at 80V is 280 kJ. Thus, the maximum energy level to recharge the supercapacitors at this time is particular time is 280 kJ−133 kJ=147 kJ. Moreover, if the platform is now moved at 1 m from ground, based on the system model, the potential energy that may be regenerated with a fully loaded platform is 47 kJ. The energy capacity of a supercapacitor 40 of 100 F at 80V is 280 kJ. Thus, the maximum energy level to recharge the supercapacitors at this time is 280 kJ−47 kJ=233 kJ.

Figure 6:
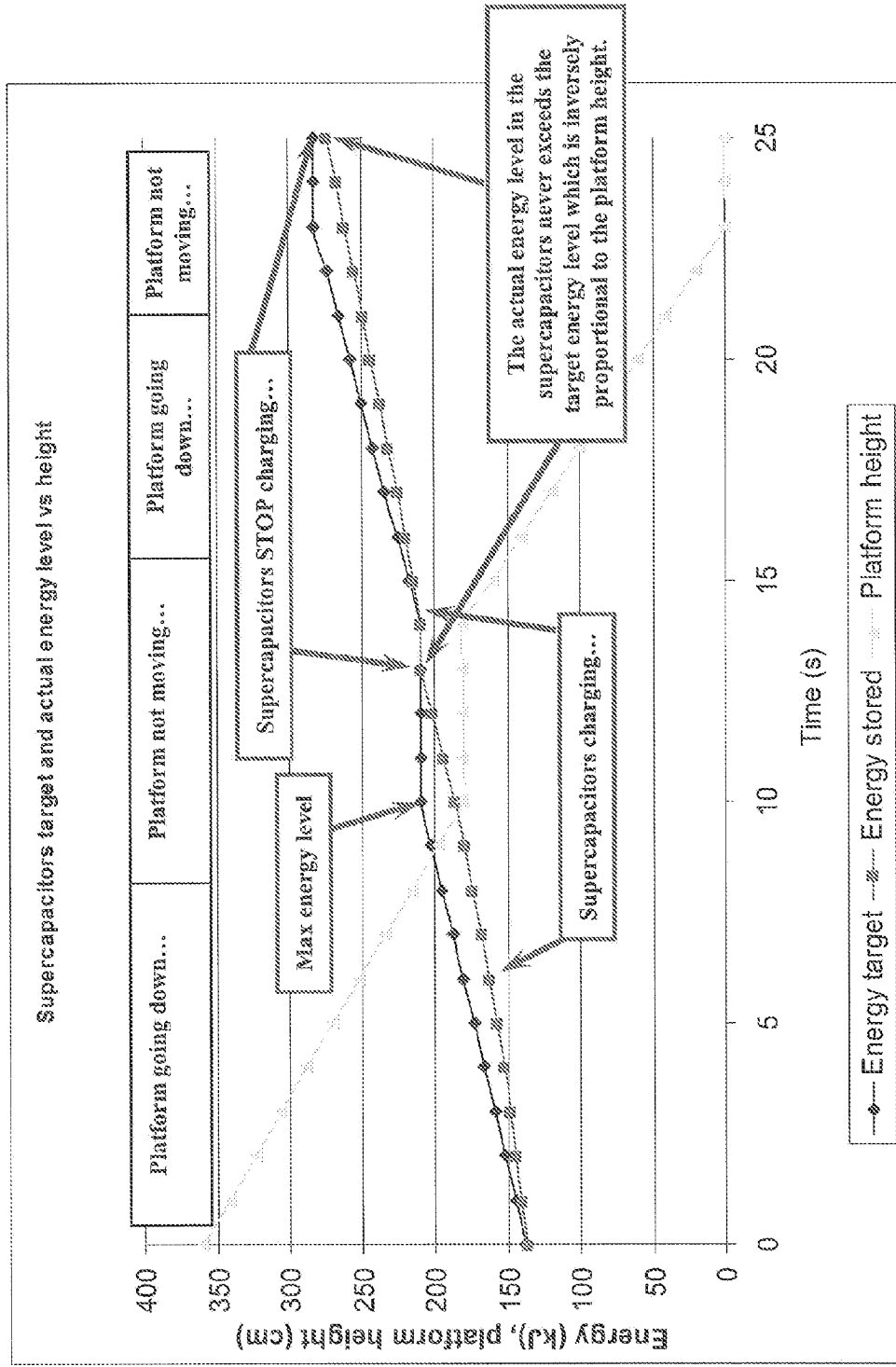
FIG. 6 is a graph showing a sequence of operations of the system along a timeline.

At FIG. 6, there is shown a graph illustrating a sequence wherein the platform is first being lowered, then regenerating energy, then stopping, and finally resuming lowering, during a time period ranging from 0 to 25 seconds (sec.). More particularly, the graph represents a scenario, wherein the platform is being lowered between times 0 to 8 sec., approximately (i.e. lowering movement detected), then the platform remains immobile between times 8 to 15 sec., approximately (i.e. immobile movement detected), then the platform resumes lowering between times 15 and 21 sec., approximately (i.e. lowering movement detected) and finally, the platform stops again between times 23 and 25 sec., approximately (i.e. immobile movement detected).

The curve which is dotted with triangles represents the height of the platform. The curve which is dotted with diamonds represents the maximum energy level (or target energy level) calculated from the height of the platform. The curve which is dotted with squares represents the actual energy level of the supercapacitors (or energy store in the supercapacitors), which tries to match the maximum energy level calculated. The difference between the two curves is due to the limitation of the DC/DC converter maximum current and this is why the energy level is only reached at a time of 13 seconds and 25 seconds.

As can be seen, when the platform is being lowered, between times to 8 sec. and between times 15 to 21 sec., the supercapacitors are being recharged. The supercapacitors are also recharged during a portion of the time the platform is immobile, namely between 10 to 14 sec., as well as between 23 to 25 sec. Moreover, at 13 sec. and 25 sec, the supercapacitors stop charging because, as mentioned above, they have reached the target energy level.

With reference now to FIG. 7A to 7E, different scenarios of the system in operation are exemplified, shown on simplified schematic representations of the system.

Figure 7A:
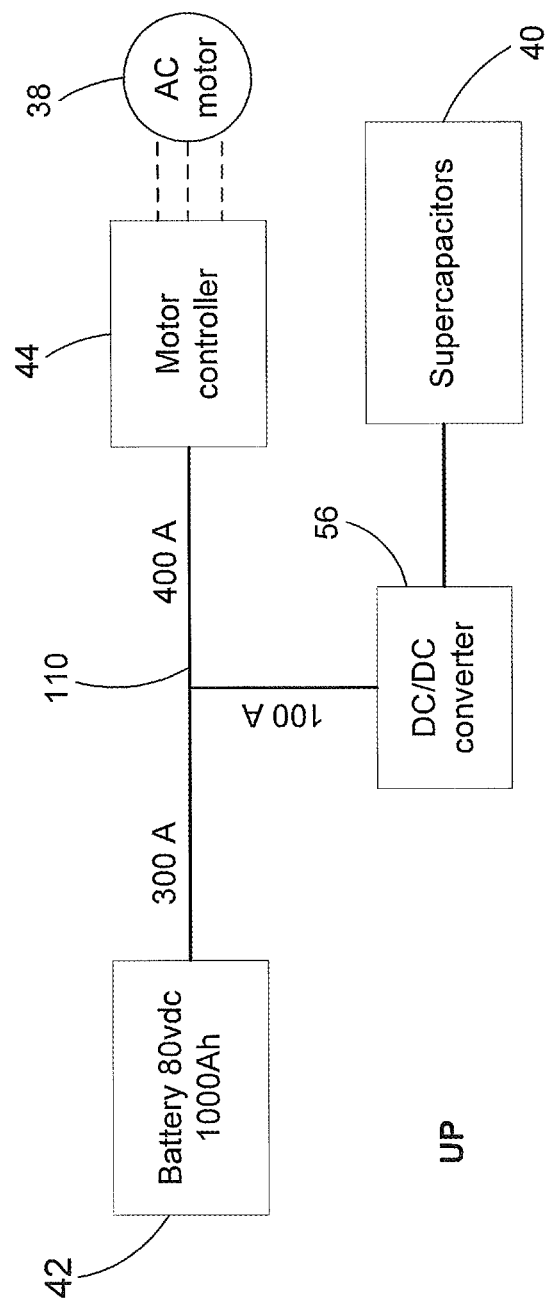
FIG. 7A is a schematic block diagram showing elements and operations of an energy management system according to an embodiment of the present invention, at a given moment.

At FIG. 7A, there is shown a first scenario wherein an operator enters a command input to lift or raise the platform. For the purpose of exemplification, the motor controller 44 requires 400 A at this time. The 400 A is first fed by the battery 42. The DC/DC converter 56 then reacts and draws energy from the supercapacitors 40 which is reflected on the 80V bus line 110 to reduce the battery current, for example by 100 A, namely to 300 A, since (400 A=100 A+300 A) for example. This current is limited by the DC/DC converter capacity and the energy available in the supercapacitors 40 at this time.

Figure 7B:
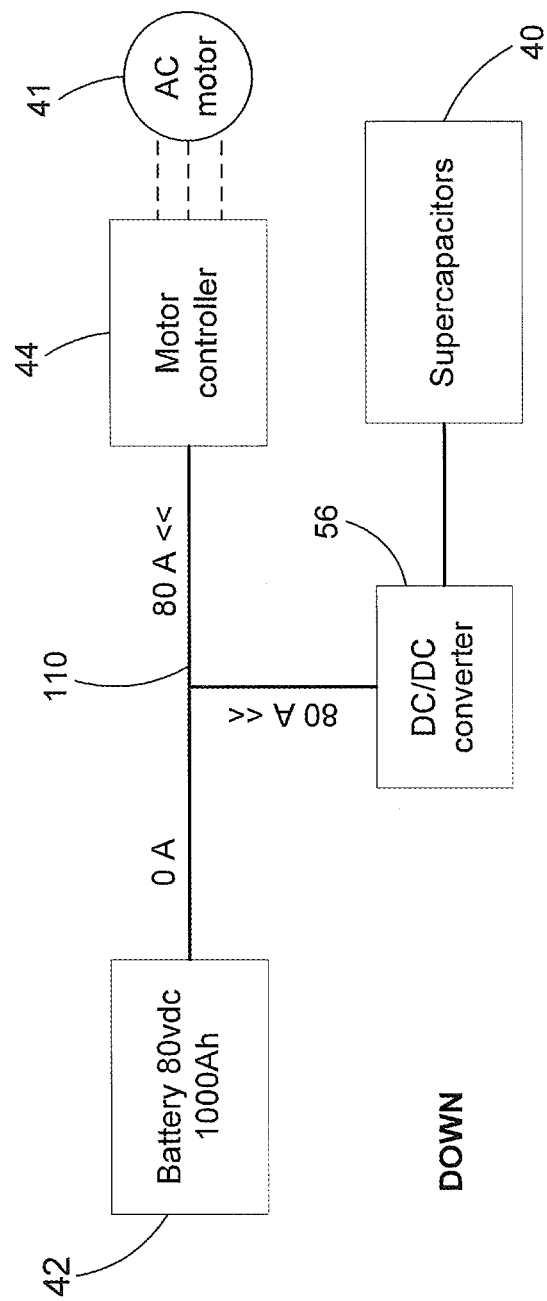
FIG. 7B is another schematic block diagram showing elements of an energy management system according to the embodiment shown in FIG. 7A, at another given moment.

At FIG. 7B, there is shown a second scenario wherein the operator enters a command input to lower the platform. The motor controller 44 thus regenerates energy and sends current on the 80V bus line, for example, 80 A. The 80 A naturally tends to go back to the battery 42. However, the DC/DC converter 56 stores energy into the supercapacitors 40 by taking the energy from the 80V bus line to avoid recharging the battery.

Figure 7C:
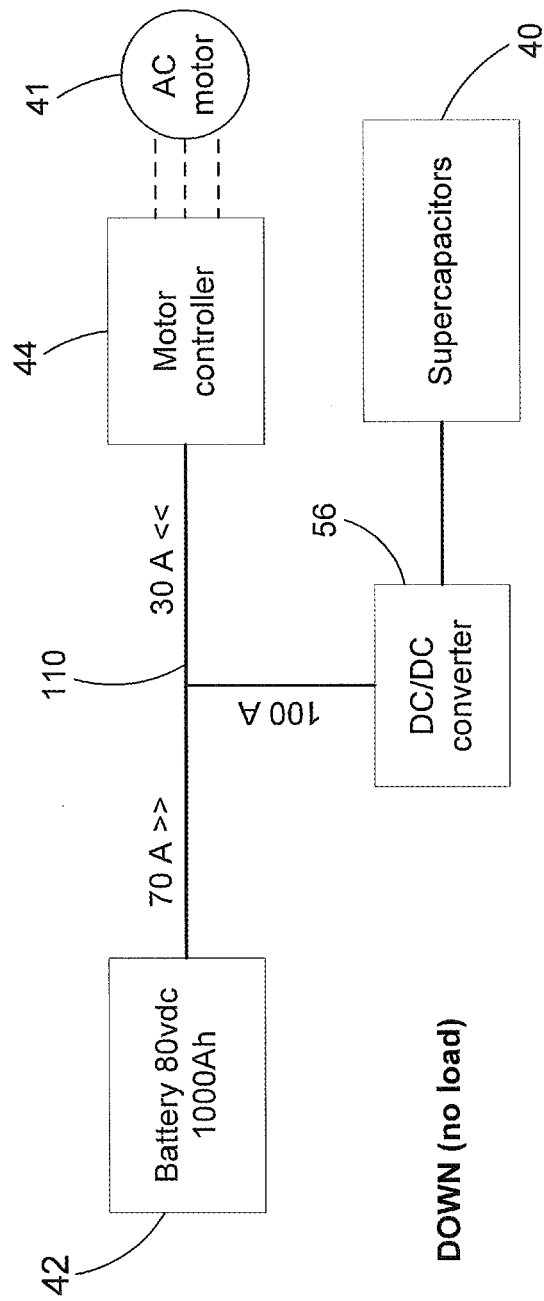
FIG. 7C is another schematic block diagram showing elements of an energy management system according to the embodiment shown in FIG. 7A, at another given moment.

At FIG. 7C, there is shown a third scenario wherein the operator enters a command input to lower the platform, and there is no load on the platform. The motor controller will regenerate energy and send current on the 80V bus line, for example, 30 A since the platform carries no load. The PLC will determine what current is transferred by the DC/DC converter 56 and depending on the supercapacitors' 40 level of energy stored, this current may be more than 30 A, for example, 100 A in order to recharge the supercapacitors 40 at a faster rate. The battery thus supplies energy at this time to recharge the supercapacitors 40, instead of waiting for the platform to be at ground level, in order to prepare to supply power to the system when the operator will lift the platform again.

Figure 7D:
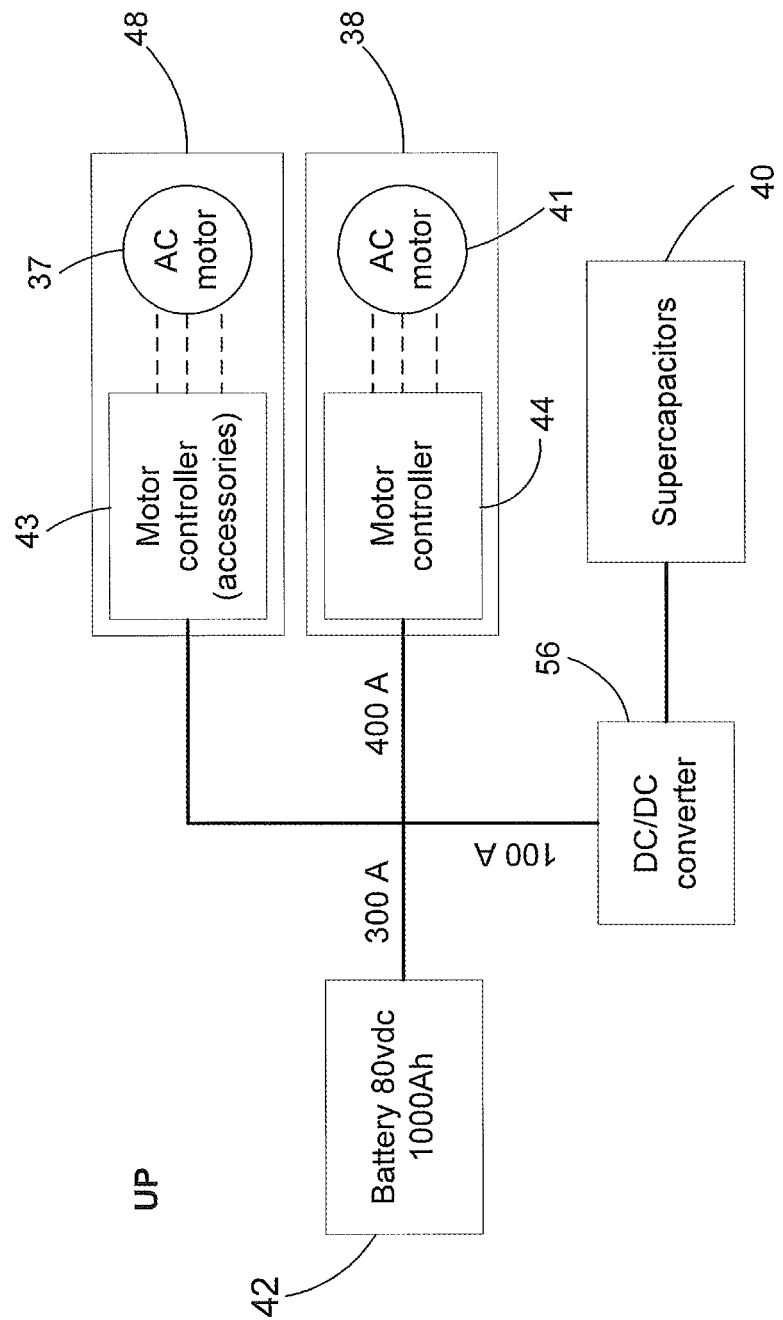
FIG. 7D is a schematic block diagram showing elements of an energy management system according to another embodiment of the present invention, at a given moment.
Figure 7E:
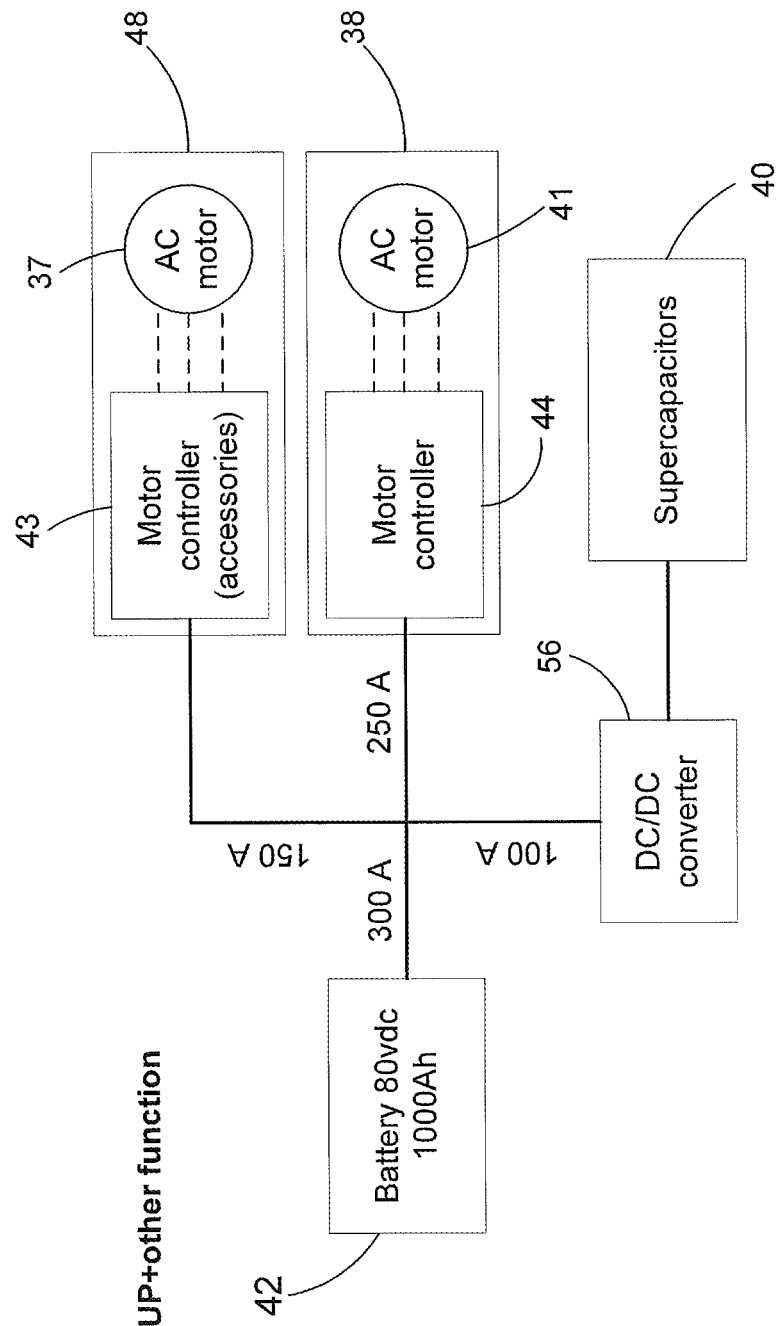
FIG. 7E is another schematic block diagram showing elements of an energy management system according to the embodiment shown in FIG. 7D, at another given moment.

At FIGS. 7D and 7E, there is shown a fourth scenario wherein the operator enters a command input to lift or raise the platform.

For the purpose of exemplification, the motor controller 44 for the lift requires 400 A at this time for this particular operation, as better illustrated in FIG. 7D. The PLC 46 controls the DC/DC converter 56 and the supercapacitors 40 to output energy reserve in order to reduce the power load on the battery 42.

A few seconds later, the operator actuates another function on the loader, for example a cargo transfer, while still lifting the rear platform. The motor controller 43 for the accessories will then require, for example 150 A, as illustrated in FIG. 7E.

The PLC 46 then reduces the current allocated for the lifting, in order to diminish the total power demand from the battery 42. As a result, the platform is lifted more slowly, i.e. less power is allocated to motor 37 but the battery power required remains the same.

Thus, the above-described system seeks to apply the principles related to the Peukert effect on batteries, power loss in cables and components and the negative effect of battery charging and discharging.

The energy storage device, or the supercapacitors according to embodiments of the present invention, provide an energy buffer to absorb energy when the platform is being lowered (i.e. going down), while the motor regenerates the platform's potential energy into electricity, and also give back this energy at a later time to reduce the battery power load.

The energy-storage-device controller, or the DC-DC converter according to embodiments of the present invention, allows controlling the current flow between the supercapacitors and the 80V DC bus to which the motor controller(s) and battery are connected.

As a results, the average battery power is low in comparison to known conventional systems because some of the energy is regenerated. Moreover, the battery power required may be spread over time so to eliminate dead times and peak demands, and thus minimize the overall battery current level at all times. As an additional advantage, the reduced current attenuates the power loss in cables and components. Moreover, the battery is mostly discharged and, preferably never, recharged during normal operation of the loader for advantageously optimizing battery life and efficiency.

According to a preferred embodiment, the four above-described independent closed-loop systems, namely the platform raising loop 300, the platform lowering loop 400, the accessories motor loop 500 and the DC/DC converter current loop 200 (see FIG. 4), are provided in the system and cooperate in order to determine in real-time the optimal speed of respective motors and the current flow supplied to or drawn from the supercapacitors, via the DC/DC converter. The system is thereby constantly looking to achieve an optimal state to operate.

The efficiency of a loader being provided with the above-described system and method is greatly improved. In application, the number of raising and lowering cycles of the platform lift was increased by about 30 to 40% depending on the average weight of the cargo, in comparison to an electric loader without this energy regeneration and management system.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. An energy management system for managing a current flow in a machine having a lift element being vertically movable by a motor assembly, the energy management system comprising:
   a power supplying bus for supplying the motor assembly;
   a battery source being connected to the power supplying bus;
   an energy storage device;
   an energy-storage-device controller connected between the energy storage device and the power supplying bus, for controlling a current flow between the energy storage device and the power supplying bus;
   sensors for detecting a height H and a movement of the lift element, said movement being selected from the group consisting of a lifting movement, a lowering movement and an immobile movement;
   a first calculator connected to the sensors for calculating a minimum energy $E_{min}$ required in the energy storage device as a function of the height H of the lift element;
   a second calculator connected to the energy storage device for calculating an energy $E_{available}$ stored in the energy storage device based on a voltage $V_{cap}$ detected at terminals of the energy storage device and on a parameter of the energy storage device;
   a comparator for calculating an Error where Error=$E_{min}$−$E_{available}$;
   a third calculator for setting a lower limit $I_{min}$ of a current to be drawn from the energy storage device to 0 A when the movement detected by the sensors is the immobile or lowering movement, and for calculating the lower limit $I_{min}$ as a function of Error when the movement detected by the sensors is the lifting movement;
   a fourth calculator for calculating an upper limit $I_{max}$ of a current to be supplied to the energy storage device as a function of Error when the movement detected by the sensors is the immobile or lowering movement; and
   a main controller for controlling the energy-storage-device controller as a function of $I_{min}$, $I_{max}$, and the movement detected, to adjust the current flow between the energy storage device and the power supplying bus.

2. The energy management system according to claim 1, wherein the energy storage device comprises one or more supercapacitors.

3. The energy management system according to claim 1, wherein the energy-storage-device controller is a DC-DC converter.

4. The energy management system according to claim 1, wherein one of said sensors is an inclinometer for measuring an angle and for detecting the height H therefrom.

5. The energy management system according to claim 1, further comprising:
a memory storage unit for storing data; and
wherein said first, second, third and fourth calculators, said comparator and said main controller are provided in a Programmable Logic Controller being connected to the memory storage unit.

6. The energy management system according to claim 5, wherein one of said sensors is provided in the Programmable Logic Controller for detecting the movement of the lift element based on an operating command received at the Programmable Logic Controller.

7. The energy management system according to claim 1, in combination with said machine, the energy management system being operatively connected to the lift element.

8. The energy management system in combination with the machine according to claim 7, further comprising:
a supporting assembly for supporting the lift element; and
wherein one of said sensors is an inclinometer connected to the supporting assembly for measuring an angle and detecting the height H therefrom.

9. An energy management method for managing a current flow in a machine having a lift element being vertically operable by a motor assembly, the motor assembly being supplied with energy, through a power supplying bus, by a battery source and by an energy storage device via an energy-storage-device controller, the method comprising:
(a) detecting a height H and a movement of the lift element, said movement being selected from the group consisting of a lifting movement, a lowering movement and an immobile movement;
(b) calculating a minimum energy $E_{min}$ required in the energy storage device as a function of the height H of the lift element;
(c) calculating an energy $E_{available}$ stored in the energy storage device based on a voltage $V_{cap}$ detected at terminals of the energy storage device and on a parameter of the energy storage device;
(d) calculating an error Error where Error=$E_{min}$−$E_{available}$;
(e) setting a lower limit $I_{min}$ of a current to be drawn from the energy storage device to 0A when the movement detected at (a) is the immobile or lowering movement, and calculating the lower limit $I_{min}$ as a function of Error when the movement detected at (a) is the lifting movement;
(f) calculating an upper limit $I_{max}$ of a current to be supplied to the energy storage device as a function of Error when the movement is the immobile or lowering movement; and
(g) controlling the energy-storage-device controller as a function of $I_{min}$, $I_{max}$ and the movement detected at (a) to manage the current flow between the energy storage device and the power supplying bus.

10. The method according to claim 9, wherein the determining at (a) comprises:
measuring an angle via an inclinometer; and
determining a height H of the platform as a function of the angle measured by the inclinometer.

11. The method according to claim 10, wherein the height is determined at (a) by means of a table of correspondence.

12. The method according to claim 9, further comprising:
providing an energy $Ecap_n$ available in the energy storage device at n Volts, a maximum energy $E_{total}$ which is storable in the energy storage device and maximum height $H_{total}$ of the lifting element; and
wherein $E_{min}$ is calculated at (c) according to:

$E_{min} = Ecap_n + (E_{total} - Ecap_n)/(H_{total}) \times H$, wherein
n is a constant having a value based on a parameter of the energy-storage-device controller and a voltage of the battery.

13. The method according to claim 12, wherein n=40V, $Ecap_n$=80,000 J, $E_{total}$=320,000 J and $H_{total}$=3,000 mm.

14. The method according to claim 9, wherein the parameter of the energy storage device is a Capacity provided in Farads and wherein the $E_{available}$ is calculated at (c) according to:

$E_{available} = (Capacity \times V_{cap} \times V_{cap})/2$.

15. The method according to claim 9, further comprising:
detecting a power state of the machine, said power state being selected from the group consisting of a powered state and a shutdown state; and
at (f), setting the lower limit $I_{min}$ of said current to be drawn from the energy storage device to −150 A when the power state detected is a shutdown state.

16. The method according to claim 9, further comprising:
detecting a voltage $V_{bat}$ at terminals of the battery source; and
wherein, when the movement detected at (a) is the lifting movement, $I_{min}$ is calculated at (f) according to:
if Error<0 and Error>−2 then $I_{min} = Error \times 75 \times V_{cap}/V_{bat}$ otherwise, if Error<=−2

$I_{min} = -150 \times V_{cap}/V_{bat}$ otherwise, $I_{min} = 0$,

17. The method according to claim 9, further comprising:
detecting a voltage $V_{bat}$ at terminals of the battery source; and
wherein $I_{max}$ is calculated at (g) according to:
if Error>0 and Error<2 then $I_{max} = Error \times 75 \times V_{cap}/V_{bat}$ otherwise, if Error>=2

$I_{max} = 150 \times V_{cap}/V_{bat}$ otherwise, $I_{max} = 0$.

18. The method according to claim 9, further comprising prior to (a):
calculating a battery current target based on at least one of the voltage $V_{cap}$ and the movement detected at (a); and
adjusting a current drawn from the battery source by the energy-storage-device controller, according to the battery current target.

19. The method according to claim 18, wherein the calculated battery current target ranges between −150 A and 300 A.

20. The method according to claim 19, further comprising:
detecting a power state of the machine, said power state being selected from the group consisting of a powered state and a shutdown state; and
wherein the battery current target is calculated according to:

if the voltage $V_{cap}$ is lower than 30 V, setting the battery current target to 50 A;
if the voltage $V_{cap}$ is greater than 30 V and the movement detected at (a) is the lifting movement, setting the battery current target to 200 A;
if the voltage $V_{cap}$ is greater than 30 V and the movement detected at (a) is the lowering movement, setting the battery current target to 150 A;
if the voltage $V_{cap}$ is greater than 30 V and the movement detected at (a) is the immobile movement, setting the battery current target to 150 A; and
if the power state detected corresponds to a shutdown state, setting the battery current target to −150 A.

* * * * *